(12) United States Patent
Hong et al.

(10) Patent No.: US 8,088,709 B2
(45) Date of Patent: Jan. 3, 2012

(54) PREPARATION METHOD OF VANADIUM/TITANIA-BASED CATALYST SHOWING EXCELLENT NITROGEN OXIDE-REMOVAL PERFORMANCE AT WIDE TEMPERATURE WINDOW THROUGH INTRODUCTION OF BALL MILLING, AND USE THEREOF

(75) Inventors: Sung Ho Hong, Seoul (KR); Jun Yub Lee, Gwacheon-si (KR); Seok Joo Hong, Seongnam-si (KR); Sung Pill Cho, Siheung-si (KR); Chang Hoon Shin, Goyang-si (KR); Sung Chang Hong, Seoul (KR); Sang Hyun Choi, Goyang-si (KR); Suk Jae Kang, Seongnam-si (KR); Pill Won Seo, Suwon-si (KR)

(73) Assignee: Korea Power Engineering Company, Inc., Gyeonggi-Do (KR)

( * ) Notice: Subject to any disclaimer, the term of this patent is extended or adjusted under 35 U.S.C. 154(b) by 245 days.

(21) Appl. No.: 12/226,019

(22) PCT Filed: Mar. 20, 2007

(86) PCT No.: PCT/KR2007/001362
§ 371 (c)(1),
(2), (4) Date: Oct. 3, 2008

(87) PCT Pub. No.: WO2007/114570
PCT Pub. Date: Oct. 11, 2007

(65) Prior Publication Data
US 2009/0060810 A1    Mar. 5, 2009

(30) Foreign Application Priority Data

Apr. 3, 2006    (KR) .................. 10-2006-0030227

(51) Int. Cl.
*B01J 37/00*    (2006.01)
*B01J 37/02*    (2006.01)
*B01J 37/025*    (2006.01)

(52) U.S. Cl. ........ 502/350; 502/300; 502/349; 502/353; 423/62; 423/69

(58) Field of Classification Search ............... 423/239.1, 423/62, 69; 502/309, 300, 349, 350, 353
See application file for complete search history.

(56) References Cited

U.S. PATENT DOCUMENTS

| | | | |
|---|---|---|---|
| 5,292,704 A * | 3/1994 | Lester | 502/309 |
| 5,696,049 A * | 12/1997 | Ikeyama et al. | 502/350 |
| 6,503,475 B1 * | 1/2003 | McCormick et al. | 423/592.1 |
| 2002/0055659 A1 * | 5/2002 | Wachs et al. | 568/487 |

* cited by examiner

*Primary Examiner* — Jerry Lorengo
*Assistant Examiner* — Jared Wood
(74) *Attorney, Agent, or Firm* — Abelman, Frayne & Schwab

(57) ABSTRACT

Disclosed are a method for preparing a catalyst, which has excellent nitrogen oxide-removal performance and resistance over a wide temperature range, and the use of the catalyst. According to the disclosed method, the oxidation number and surface defects of the catalyst are changed by applying artificial high energy through mechanical ball milling during the preparation process of the catalyst, instead of applying the addition of a precious metal, the deformation of a support and the use of a co-catalyst in order to increase NOx removal activity, such that activation energy for inducing redox reactions can be decreased.

7 Claims, 14 Drawing Sheets

PREPARATION METHOD OF VANADIUM/TITANIA-BASED CATALYST SHOWING EXCELLENT NITROGEN OXIDE-REMOVAL PERFORMANCE AT WIDE TEMPERATURE WINDOW THROUGH INTRODUCTION OF BALL MILLING, AND USE THEREOF

TECHNICAL FIELD

The present invention relates to a method for preparing a catalyst, which has excellent NOx (nitrogen oxides) removal performance and resistance in a wide temperature range, and the use of the catalyst. More particularly, the present invention relates to a method for preparing a catalyst having excellent nitrogen oxide-removal performance and resistance in a wide temperature range, in which the oxidation states and surface defects of the catalyst are changed by applying artificial high energy through mechanical ball milling during the process of preparing the catalyst, instead of applying the addition of noble or transition metals, the deformation of a support and the use of a secondary metal in order to increase NOx removal activity, such that activation energy for inducing redox reactions can be decreased, and relates to the use of the catalyst.

BACKGROUND ART

NOx generated from stationary sources, including industrial boilers, gas turbines, combined cycle power plants, waste incinerator, vessel engines and petrochemical plants, is a major cause of reduced visibility, the greenhouse effect ($N_2O$) and acid rain, is known to be the main cause of air pollution, and binds to oxygen in the presence of UV light to cause photochemical smog. Technology for removing such NOx can be broadly divided into primary methods, known as fuel de-nitrification and combustion modification, and a secondary method known as fuel gas treatment. In the case of fuel de-nitrification, among these methods, HDN (hydro-denitrification) is the most general, and describes a process whereby organic nitrogen contained mainly in fuel is converted into ammonia by reaction with hydrogen, so that the emission of pollutants can be inhibited. However, it requires large facility investment and cost, and the effective reduction of NOx in fuel is possible, whereas the effect of reducing thermal NOx cannot be expected. Also, methods of employing modified combustion conditions or combustion methods, for example, flue gas recirculation and air register adjustment, are currently used in practice to a considerable extent, but have a limitation on NOx reduction efficiency (40-70% of NOx emission), and thus have difficulty satisfying emission regulations, which are becoming stricter.

In view thereof, post-combustion treatment, i.e., flue gas treatment, is used for the synthetic reduction of NOx. The flue gas treatment processes are generally divided into wet treatment processes and dry treatment processes. The wet treatment processes require high facility investment and operating costs due to the low solubility of NO, and have a serious problem associated with wastewater treatment. For this reason, a lot of research aimed at increasing the NOx removal efficiency to realize the practical use of the dry treatment methods has been conducted. In connection with this, selective reduction processes, of selectively removing only NOx using a reducing agent, occupy the majority of the dry treatment processes and are divided, according to whether a catalyst is used, into selective non-catalytic reduction (SNCR) and selective catalytic reduction (SCR).

The selective non-catalytic reduction process is a technique in which a reducing agent is injected into an area having a combustion gas temperature of 850-1100° C. in a furnace without using any catalyst, so that NOx is selectively reduced into nitrogen and water vapor by reaction with the reducing agent. Parameters having a decisive effect on the selective non-catalytic reduction process include the injected amount of the reducing agent, the reaction temperature, the residence time of the reducing agent, and the mixing of the reducing agent with combustion gas, and an increase in the amount of use of the reducing agent leads to an increase in NOx reduction efficiency. However, the selective non-catalytic reduction method has NOx removal efficiency about 30-50% lower than that of the SCR process and incurs high process maintenance costs due to the excessive use of the reducing agent and the high temperature operating conditions. Also, it can cause adhesion/corrosion problems in a downstream heat exchanger due to the production of salts, such as ammonium bisulfate ($NH_4HSO_4$) and ammonium sulfate ($(NH_4)_2SO_4$), which arise from unreacted ammonia.

For this reason, the selective catalytic reduction (SCR) process, which can show high denitrification efficiency by increasing the reaction rate between a reducing agent and NOx in a lower temperature range using a catalyst, is recognized as the most advanced denitrification process. As shown in reaction equations 1-4 below, the SCR process is characterized in that NOx is removed in the form of harmless nitrogen and water vapor by mixing NOx with ammonia as a reducing agent at an operating temperature of 250-450° C. and passing the mixture through a catalyst layer. However, in fact, NOx is removed according to the reaction equations 3 and 4, because flue gas contains oxygen.

$$6NO+4NH_3 \rightarrow 5N_2+6H_2O \quad \text{[Reaction Equation 1]}$$

$$6NO_2+8NH_3 \rightarrow 7N_2+12H_2O \quad \text{[Reaction Equation 2]}$$

$$4NO+4NH_3+O_2 \rightarrow 4N_2+6H_2O \quad \text{[Reaction Equation 3]}$$

$$2NO_2+4NH_3+O_2 \rightarrow 3N_2+6H_2O \quad \text{[Reaction Equation 4]}$$

However, in the above process, ammonia to be used as the reducing agent reacts with oxygen to produce nitrogen and NOx, as shown in reaction equations 5-8 below.

$$4NH_3+3O_2 \rightarrow 2N_2+6H_2O \quad \text{[Reaction Equation 5]}$$

$$4NH_3+4O_2 \rightarrow 2N_2O+6H_2O \quad \text{[Reaction Equation 6]}$$

$$4NH_3+5O_2 \rightarrow 4NO+6H_2O \quad \text{[Reaction Equation 7]}$$

$$4NH_3+7O_2 \rightarrow 4NO_2+6H_2O \quad \text{[Reaction Equation 8]}$$

In general, $NH_3$ oxidation actively occurs as the reaction temperature increases to high temperatures, and it occurs in competition with NOx reduction, and thus the conversion rate of NOx changes depending on the temperature. If water is not included, the reaction according to the reaction equation 6 will not substantially occur, NOx will be generated specifically according to the reaction equations 7 and 8, and thus the reactions according to the reaction equations 7 and 8 should be inhibited. However, the rates of such reactions will increase with an increase in temperature. For this reason, in order to prevent side reactions from occurring at high temperatures, there is an urgent need to develop a catalyst having excellent selective NOx reduction performance even at low temperatures. Meanwhile, flue gas generally contains water and sulfur oxides, which produce salts on the catalyst, thus reducing the activity of the catalyst. Reactions that are the main cause of this catalyst poisoning occur according to reaction equations 9-12 below.

$$2NH_3 + H_2O + 2NO_2 \rightarrow NH_4NO_3 + NH_4NO_2 \quad \text{[Reaction Equation 9]}$$

$$2SO_2 + O_2 \rightarrow 2SO_3 \quad \text{[Reaction Equation 10]}$$

$$NH_3 + SO_3 + H_2O \rightarrow NH_4HSO_4 \quad \text{[Reaction Equation 11]}$$

$$SO_3 + H_2O \rightarrow H_2SO_4 \quad \text{[Reaction Equation 12]}$$

The reaction equation 9 is a reaction in which $NO_2$ reacts with $NH_3$ to form ammonium nitrate, and it is known that such ammonium nitrate is decomposed at a temperature higher than 150° C., and thus does not cause catalyst poisoning. However, in actual processes, ammonia is injected at a temperature higher than 150° C., and thus catalyst poisoning is induced, because $SO_3$ produced according to the reaction equation 10 forms sulfate according to the reaction equation 11, and the sulfate remains on the catalyst surface without being decomposed. Also, sulfuric acid is produced according to the reaction equation 12, and can be a cause of corrosion of the catalytic layer and downstream facilities. For this reason, there is a need to develop a low-temperature, high-activity denitrification catalyst which can suppress the production of sulfate and sulfuric acid according to the reaction equations 11 and 12.

In general, as catalysts that are used in the selective catalytic reduction technique, various catalysts, including noble or transition metal catalysts and basic catalysts, have been proposed. Recent SCR catalysts have been mostly studied with respect to vanadium, and it is known that the use of $V_2O_5$ loaded on a $TiO_2$ support shows the most excellent effect on selective catalytic reduction.

The prior art relating to such $V_2O_5$ catalysts is as follows.

U.S. Pat. No. 4,152,296 discloses a process for preparing a catalyst for the denitrification of flue gas, which comprises impregnating a $TiO_2$ support with at least 1% by weight (preferably 0.35-1.35% by weight) of a vanadium atom based on the weight of said support of vanadium sulfates ($VSO_4$), vanadyl sulfates ($VOSO_4$) and a mixture thereof and then reacting a mixed gas of ammonia and inert gas with the impregnated support at a temperature of 300-520° C. The prepared catalyst has a pore volume of 0.3-0.45 mL/g and a specific surface area of 20-50 m²/g.

U.S. Pat. No. 4,929,586 discloses a catalyst for the removal of NOx, in which a catalytic component selected from the group consisting of $V_2O_5$, $MoO_3$, $WO_3$, $Fe_2O_3$, $CuSO_4$, $VOSO_4$, $SnO_2$, $Mn_2O_3$, and $Mn_3O_4$ is supported on a titania ($TiO_2$) support having an anatase crystal structure. Also, it discloses that the catalyst has an NOx conversion rate of about 90% at a temperatures around 350° C. According to the disclosure of said patent, $TiO_2$, used as the support, has a total porosity of up to 0.80 cc/cc, which is made up of a micropore porosity (comprising pores having a pore diameter 600 Å or less) of 0.05 to 0.5 cc/cc and a macroporosity (comprising pores having diameters greater than 600 Å) of 0.05 to 0.5 cc/cc.

U.S. Pat. No. 5,045,516 discloses a process for preparing a catalyst for reducing NOx, in which molybdenum trioxide and less than 10 wt % of vanadium pentoxide are supported on $TiO_2$. In said patent, in order to prevent the catalyst from being inactivated by catalyst poisons, such as arsenic compounds in flue gas, the contents of calcium and iron in the $TiO_2$ composition are limited to less than 500 ppm and 100 ppm, respectively, said $TiO_2$ being present in a proportion of over 60% as the anastase type structure, and having a mean particle size of 10 to 100 nm, a mean pore radius of 10 to 30 nm and a BET surface of 10 to 80 m²/g.

U.S. Pat. No. 6,054,408 discloses a method for preparing a catalyst for reducing NOx, in which 0.01-5 wt % of molybdenum trioxide and 0.01-5 wt % of vanadium pentoxide are supported on anatase-type $TiO_2$. In the case of $TiO_2$, used as the support in said patent, the proportion of rutile type in the crystal structure is limited to less than 5%, the content of sodium, potassium and iron is limited to less than 500 ppm, and the content of phosphorus is limited to less than 0.5%.

U.S. Pat. No. 4,952,548 discloses a catalyst for removing NOx, in which the atomic ratio of Ti:Mo or W:V is 80-96.5: 3-15:0.5-5. In particular, in order to prevent poisoning caused by the adsorption of heavy metals on the $TiO_2$ surface, the size of the crystallite of the titanium oxide according to Sherrer's equation is in the range of 185-300 Å in the direction of a (101) phase.

U.S. Pat. No. 4,916,107 discloses a catalyst for removing NOx, comprising: titanium oxide, tungsten oxide; and at least one selected from the group consisting of vanadium, iron, niobium and molybdenum. Specifically, $TiO_2$ used as the support is mainly present in the form of anatase, has an average primary particle size of 30 nm, a loss on drying of 1.5 wt % and a loss on ignition of 2 wt %, and comprises 99.5 wt % $TiO_2$, 0.3 wt % $Al_2O_3$, 0.2 wt % $SiO_2$, 0.01 wt % $Fe_2O_3$ and 0.3 wt % HCl.

The above-described patents specify only the physical properties of $TiO_2$, used as the support, and the content of vanadium in the preparation of NOx removal catalysts, and comprise adding a secondary metal in order to increase reaction activity and resistance, but do not mention the effect of changes in the properties of catalysts on selective catalytic reduction. Also, an example where a mechanochemical method for high energy transfer is applied for the preparation of a selective reduction catalyst, as disclosed in the present invention, cannot be seen in the above patents.

Till now, techniques of imparting high denitrification efficiency and $SO_2$ resistance by adding tungsten, molybdenum and the like to vanadium/titania-based catalysts for flue gas denitrification have been somewhat commonly used. Such techniques show relatively high denitrification efficiency at a temperature of about 350° C., but show low denitrification efficiency at a temperature lower than 260° C., and thus impose a limitation on the installation of the SCR system. Generally, the SCR process in power plants is provided in upstream or downstream of a desulfurization system, and when it is provided in upstream of the desulfurization system, abrasion problems, caused by catalytic fatigue and dust, and life-cycle reduction problems, caused by sulfur dioxide poisoning, will arise. In consideration of such problems, the SCR process is generally provided after the desulfurization facilities. In this case, the temperature of flue gas rapidly decreases after desulfurization, because the desulfurization process is conducted as a wet process. For this reason, an additional heat source is required to attain optimal efficiency, and thus the use of large amounts of energy is inevitable. Also, the production of salts, such as $NH_4NO_3$ and $NH_4HSO_4$, which are generated in a low-temperature range, has problems in that the salts corrode systems, shorten the life cycle of catalysts and reduce denitrification efficiency. To solve the above-described problems, various attempts have been made, but have not yet reached a satisfactory step.

In connection with this, Korean Patent Application No. 2002-17168, filed in the name of the present applicant, discloses a catalyst for removing nitrogen oxides and/or dioxin, in which vanadium oxides are supported on a titania support, capable of providing lattice oxygen, in an amount of 0.3-10 wt % based on the weight of the titania, and the non-stoichiometric ratio of the vanadium oxides, defined as the molar ratio of $VO_x$ (x<2.5)/$V_2O_5$, is more than 2.0, said $VO_x$ containing $V_2O_3$ as a main component. According to the disclosure of this prior art, titania, capable of providing lattice oxygen to vanadium is used in the preparation of the catalyst to form $VO_x$ (x<2.5, mainly vanadium trioxide) in addition to $V_2O_5$ as catalytic component vanadium oxides, and the non-stoichiometric ratio of the vanadium oxides is set at more than 0.2, such that the lattice oxygen on the catalyst surface can easily participate in selective catalytic reduction due to electron migration between the metal oxides of the catalyst and reactants during the reaction of ammonia with nitrogen oxides. This technology is a technology of using a specific support in the preparation of a catalyst to form non-stoichiometric vanadium oxides, but there is still a limitation on the use of support. Thus, in order to apply optimal denitrification systems in various fields, there is a need to develop a high-activity denitrification catalyst, which can maintain high activity even in a low temperature range and is particularly suitable for commercial purposes, unlike the prior commercial vanadium/titania-based catalysts.

DISCLOSURE

Technical Problem

Accordingly, the present inventors have conducted studies on catalysts having excellent activity even in a low-temperature range, because the prior commercialized $V_2O_5/TiO_2$-based catalyst can achieve catalytic activity required in a high-temperature range higher than 300° C. As a result, the present inventors have found that, when a mechanical ball milling step is introduced before and/or after calcination during a catalyst preparation process, a selective reduction catalyst for flue gas denitrification, which shows excellent reaction activity not only at high temperatures but also at low temperatures, through the production and increase of non-stoichiometric oxides, can be prepared. In addition, the present inventors have found that, when the catalyst prepared according to the above method is applied, not only is a reaction at low temperatures possible, but also resistance to various factors that inactivate the catalyst is increased.

Therefore, it is an object of the present invention to provide a method for preparing a selective reduction for flue gas denitrification, which shows excellent reaction activity not only at high temperatures, but also low temperatures, through the production and increase of non-stoichiometric oxides.

It is another object of the present invention to provide a method for preparing a catalyst for flue gas denitrification, which can effectively inhibit a catalyst poisoning problem caused by sulfur oxides, such as sulfur dioxide, in flue gas, and an apparatus corrosion problem caused by sulfuric acid.

Still another object of the present invention is to provide a method of removing nitrogen oxides from flue gas using said catalyst.

Technical Solution

To achieve the above objects, according to a first aspect of the present invention, there is provided a method for preparing a selective reduction catalyst for flue gas denitrification, the method comprising a step of supporting 0.5-10 wt %, based on the weight of titania, of vanadium oxide on a titania support, in which the titania support having the vanadium oxide supported thereon is subjected to a ball milling step before and/or after the calcination thereof.

According to a second aspect of the present invention, there is provided a method for removing nitrogen oxides contained in flue gas, the method comprising a step of subjecting the nitrogen oxides-containing flue gas to selective catalytic reduction in the presence of the catalyst prepared according to said method and ammonia as a reducing agent under conditions of temperature of 150-450° C. and a gas hourly space velocity (GHSV) of 1,000-120,000 $hr^{-1}$.

Advantageous Effects

In the method for preparing the vanadium/titania-based catalyst according to the present invention, non-stoichiometric oxides are produced and increased by introducing the ball milling step before and/or after calcination, and thus the prepared catalyst shows excellent reaction activity not only at high temperatures, but also at low temperatures. Also, due to the excellent redox characteristics thereof, the prepared catalyst can effectively overcome catalyst poisoning problems caused by sulfur oxides such as sulfur dioxide in flue gas, and the apparatus corrosion problem caused by sulfuric acid. In particular, when the denitrification catalyst of the present invention is applied following a dust collector or a desulfurization system, it is possible to inhibit the thermal fatigue of the catalyst, catalyst poisoning and inactivation caused by sulfur components, abrasion and plugging with dust, catalyst poisoning and inactivation by heavy metals and alkali metals, thus increasing the life cycle of the catalyst. In fact, the above-described system is possible if the denitrification catalyst has high activity at low temperatures.

Simple changes or modifications of the present invention can be readily conceived by one skilled in the art and are all considered to be within the scope of the present invention.

BEST MODE

Figure 1:
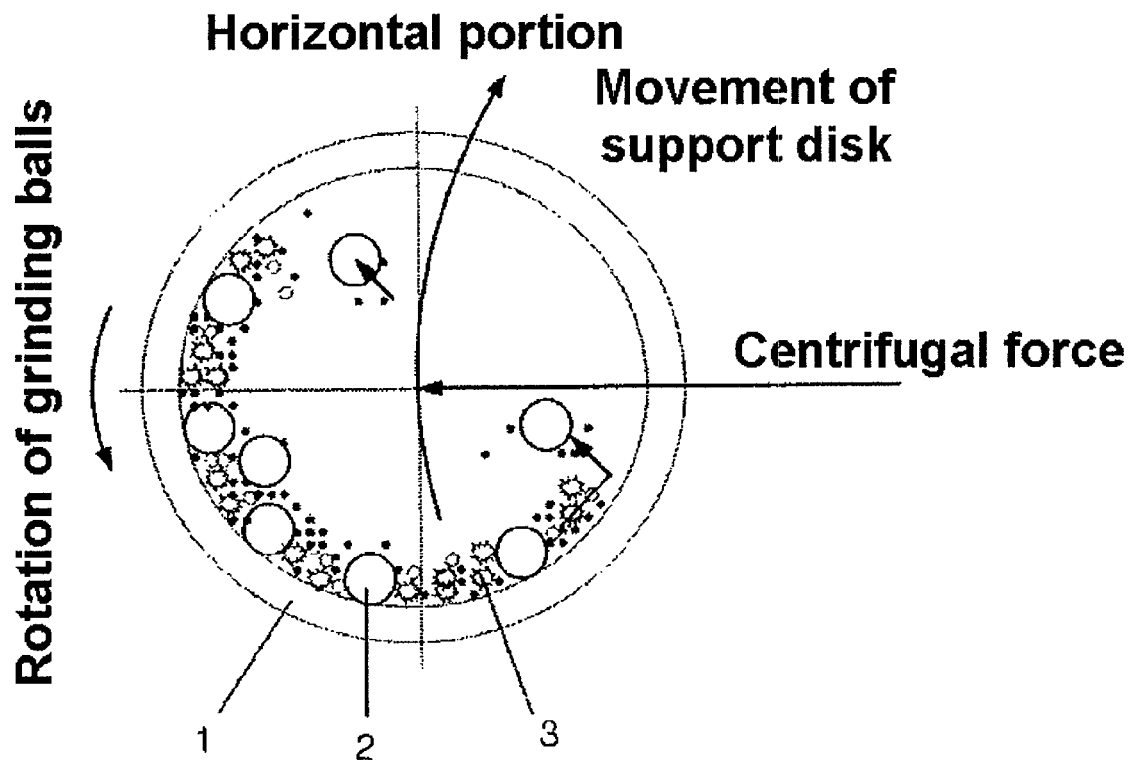
FIGS. 1 and 2 show the principle for transferring energy by ball milling used in the present invention.

Hereinafter, the present invention will be described in detail with reference to the accompanying drawings.

As described above, the present invention relates to the preparation of a catalyst showing excellent denitrification efficiency not only at high temperatures, but also at low temperatures (below about 250° C.), and to the use of the catalyst for removing nitrogen oxides (NOx) from flue gas through selective catalytic reduction, and suggests a way to artificially increase catalytic activity by introducing a mechanical ball milling step into the prior process for preparing a vanadium/titania-based catalyst. Also, it suggests the properties of a high-activity denitrification catalyst by analyzing the cause of the increase in catalytic activity.

In the case of the $V_2O_5/TiO_2$ catalyst that has already been commercialized in the prior art, only vanadium pentoxide is present on the catalyst surface. Thus, in a high-temperature range, a redox reaction easily occurs, whereas, in a low-temperature range, the electron mobility of vanadium becomes slow due to the relative decrease in thermal energy, thus reducing the NOx removal efficiency of the catalyst. Specifically, in the case of a reaction for removing nitrogen oxides from flue gas by selective catalytic reduction, the rate of a reduction reaction is typically determined by a change in the oxidation states of vanadium oxide supported on the catalyst surface. Particularly, when a selective catalytic reduction reaction occurs at low temperatures, the participation of lattice oxygen in the reduction of nitrogen oxide and the re-oxidation of gaseous oxygen into lattice oxygen are closely related to electrons generated due to the change in the oxidation states of vanadium oxide.

As used herein, the term "lattice oxygen" generally refers to oxygen which is shared on titania in the formation of vanadium oxide during a catalyst preparation process. In a selective catalytic reduction reaction, which uses ammonia as a reducing agent, the lattice oxygen is required for the removal of nitrogen oxides, and is supplemented with gaseous oxygen.

In the case of the vanadium/titania-based catalyst prepared according to the present invention, non-stoichiometric vanadium oxides that can activate the movement of electrons in a reaction process for removing NOx through selective catalytic reduction are formed on the catalyst. Thus, the redox characteristics of the catalyst, caused by electron movement, are not deteriorated even in a low-temperature range, in which electron excitation phenomena rapidly decrease. Thus, the catalyst according to the present invention can show excellent NOx removal activity even in a temperature range wider than that of the case where only vanadium pentoxide is present on the titania support. Accordingly, in order to show excellent NOx removal activity over a wide temperature range, the production of non-stoichiometric oxide is considered to be an important factor, and the amount of such non-stoichiometric oxide on the vanadium/titania-based catalyst needs to be increased.

In connection with this, the fact that the presence of non-stoichiometric oxide on a vanadium/titania-based catalyst and the increase thereof have an effect on redox mechanisms during the selective catalytic reduction of nitrogen oxides is described in detail in Korean Patent Application No. 2003-67200, which is incorporated herein by reference.

In the present invention, one of the most noteworthy advantages is that the prior preparation process of the vanadium pentoxide/titania-based catalyst is used without relatively complicated considerations, but non-stoichiometric oxide, which has a great effect on flue denitrification performance, particularly at low temperatures, can be produced and increased by introducing a mechanical ball milling step before and/or after calcination. That is, high energy is transferred to the catalyst through the ball milling to increase non-stoichiometric chemical species, including metastable $V^{4+}, V^{3+}, V^{2+}, Ti^{3+}$ and $Ti^{2+}$, so that the catalyst shows excellent NOx removal activity over a wide temperature range, including low temperatures. This increase in the non-stoichiometric chemical species results from a change in the physical properties of the catalyst due to continuous high-energy impact, and can cause the smooth movement of electrons in the catalyst through the production of highly reactive free electrons. That is, the catalyst prepared according to the present invention can efficiently remove NOx, even in a low-temperature range in which reaction activation energy is low, because lattice oxygen on the catalyst surface easily participates in reactions, and the reduced catalyst has excellent ability to convert gaseous oxygen into lattice oxygen, and thus can smoothly derive selective catalytic reduction cycles.

Thus, applying ball milling as a high-energy source to change the physical properties of the catalyst is considered to be a reasonable way to prepare a high-activity catalyst for NOx removal, and the SCR system can be applied at various positions in a flue gas treatment process, because the catalyst can show high denitrification efficiency due to ball milling. For example, the catalyst has an advantage in that it can perform a denitrification reaction even at a flue gas temperature that decreases after a dust collector or a desulfurization system. Also, it has an advantage in that the fuel cost for reheating can be effectively reduced compared to the case in which the prior high-temperature catalyst is used, because reheating is not required when the temperature of flue gas after the dust collection or desulfurization system is very low. Moreover, because it has high denitrification efficiency not only at high temperatures, but also at low temperatures, it can inhibit unreacted ammonia and inhibit the formation of ammonium salts resulting from ammonia, and thus it is possible to prevent the inactivation of the catalyst and the systems following the catalyst. In addition, it has an advantage in that it can also inhibit the formation of ammonium sulfate, because it can perform low-temperature treatment, such that $SO_2$, which can be present in flue gas, is difficult to oxidize into $SO_3$. Such reactive characteristics are possible when the catalyst has high activity in low-temperature.

In connection with this, the method for preparing the catalyst according to the present invention will now be described in further detail.

In general, the reactivity of a catalyst is determined depending on the surface characteristics of the catalyst, and such catalyst characteristics determine the structure, particle size, specific surface area, crystal phase and number of active sites of the catalyst. To modify such parameters, methods, including inert gas condensation, spray processing, and plasma deposition, are used. Among them, a mechanical ball milling process is applied for the synthesis not only of metastable materials, but also of nanocrystalline materials.

According to the present invention, based on the fact that a vanadium/titania-based catalyst having non-stoichiometric chemical species shows excellent denitrification properties at low temperatures, the production of non-stoichiometric compounds can be promoted by applying the mechanical ball milling process to a conventional catalyst. As a result, the catalyst can show high NOx removal activity (e.g., more than 80%) even at a low temperature of 200° C.

Generally, ball milling is roughly divided, according to configuration, into mixer milling, planetary milling, attrition milling and uni-ball milling, the milling processes show slight differences in properties therebetween, but in most cases, show differences in properties during processes of grinding, agglomerating and recombining powders through ball-ball collision or ball-impeller collision due to high rotational speeds.

Figure 2:
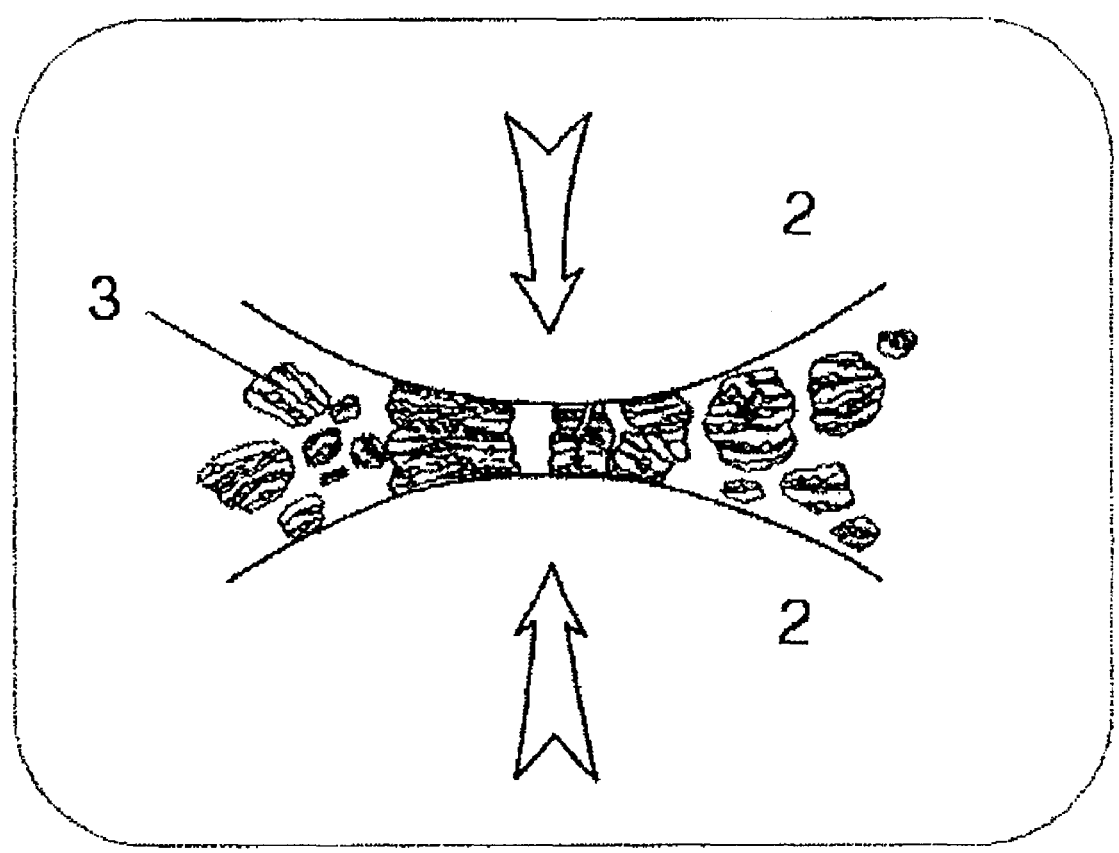

FIGS. 1 and 2 show the principle according to which energy is transferred by ball milling used in the present invention.

Referring to FIGS. 1 and 2, a support disk 1, inner balls 2 and catalyst powder particles 3 rotate with respect to the disk axis, in which the disk 1 and the inner balls rotate in opposite directions to generate centrifugal force and to transfer energy to the catalyst powder particles 3. In the ball milling process, the catalyst powder particles between the balls are repeatedly ground, agglomerated and recombined to modify the properties thereof. Thus, in order to modify the properties of the catalyst powder material to realize the desired properties through the ball milling process, the selection of a suitable support disk and balls according to the kind and size of the catalyst powder material is important, and it is required that various parameters, including turning force, rotational speed, and time, be considered.

In preparing the high-activity catalyst for flue gas denitrification according to the present invention, planetary or attrition ball milling, among the above ball milling processes, is preferably applied. An illustrative method for preparing the high-activity catalyst is as follows, but it to be noted that the scope of the present invention should not be limited thereto.

First, a vanadium source or precursor aqueous solution is prepared. As the vanadium source or precursor, it is preferable to use a vanadium compound, such as ammonium metavanadate ($NH_4VO_3$) or vanadium oxytrichloride ($VOCl_3$), but there is no particular limitation thereon. Methods for preparing the vanadium source or precursor include, but are not specifically limited to, (i) a method of obtaining the vanadium source or precursor from an anhydrous $VOCl_3$ solution, and (ii) a method of dissolving $NH_4VO_3$ in an ammonium hydroxide aqueous solution (for example, a concentration of about 1-10%), hydrochloric acid (for example, a concentration of about 1-10%) or distilled water. Among the methods (ii), in the case where $NH_4VO_3$ is dissolved in distilled water, it is preferable to add an organic acid (e.g. in an amount of about 1-2 moles per mole of $NH_4VO_3$) in order to increase the solubility of the vanadium source or precursor.

Then, titania, to be used as a support, is added to the aqueous solution to prepare slurry. It is of note that the support does not need to be limited to a particular support in the present invention, unlike Korean Patent Application No. 2002-17168. However, it is preferable to use crystalline titania, and titania usable in the present invention has a weight ratio of anatase: rutile of 0:100-100:0, preferably about 70:30-100:0, and a specific surface area of about 4-150 m²/g, preferably 50-100 m²/g. Also, it preferably has a particle size of about 5-100 nm, and more preferably about 20-50 nm. Particularly, it can contain up to 10 wt % of tungsten.

The slurry prepared as described above has a solid content of about 20-50 wt %, and is dried after it has been sufficiently stirred such that the vanadium solution and the titania support can be sufficiently mixed with each other. Preferably, the slurry is heated at about 50-70° C. while being stirred to evaporate water, and a vacuum evaporator is preferably used in the heating process. Then, it is dried at a temperature of about 80-120° C., and preferably about 100° C., for about 5-30 hours, and then placed into the support disk together with balls and subjected to ball milling. Here, the support disk and the balls are preferably made of stainless steel, alumina, zirconia, or carbon steel, and the size of the balls is preferably about 1-100 mm, and more preferably about 5-50 mm. Typically, the NOx removal efficiency of a catalyst is not greatly influenced by the size of the balls in the above-described range, because whether sufficient energy is transferred to the catalyst is more important, as can be seen in Example 2 below.

Meanwhile, the milling process is preferably carried out at a BPMR (ball powder mass ratio) of 5:1-100:1, and more preferably about 30:1-70:1, for a milling time of about 10-600 minutes, and more preferably 30-180 minutes. Then, the resulting material is generally calcined at a temperature of about 300-600° C. in an air atmosphere for about 3-12 hours, thus preparing a catalyst. The calcination process can be carried out using a tube-type, convection-type or grate-type furnace.

Meanwhile, the ball milling process can be carried out before calcination as described above (for example, before calcining the dried sample), after calcination (for example, after calcining the dried sample), or both before and after calcination.

As a means for analyzing and determining the properties of the catalyst prepared according to the present invention, XPS (X-ray photoelectron spectroscopy) can be effectively used. XPS analysis is particularly useful for the observation of changes in the chemical properties of active ingredients in the catalyst preparation step, because it can determine energy levels by the measurement of photoelectrons, thus analyzing the chemical bonding state of the catalyst and performing the analysis of elements having an atomic number of 3 or more.

According to XPS analysis, each of the elements present on the surface of the catalyst can be analyzed. Different characteristic peaks of each element shown in the spectra are separated from each other based on the intrinsic binding energies of oxides containing the corresponding element to analyze the species and distribution ratio of oxides on the surface. The characteristic peaks are separated from each other according to the Lorentzian-Gaussian method. Generally, the binding energy of $Ti^{4+}$ is 458.8 eV at Ti $2p_{2/3}$, and the binding energy of $Ti^{3+}$, which results from the reduction of $Ti^{4+}$, is 457.9 eV at Ti $2p_{2/3}$ and 463.6 eV at Ti $2p_{1/2}$, and the binding energy of $Ti^{2+}$ is 456.3 eV at Ti $2p_{2/3}$, and 462 eV at Ti $2p_{1/2}$. Also, the binding energy of $V^{5+}$ is 517.2 eV at V $2p_{2/3}$, the binding energy of $V^{4+}$ is 516.1 eV at V $2p_{2/3}$, and the binding energy of $V^{3+}$ is 515.1 eV at V $2p_{2/3}$.

The area (the number of photoelectrons obtained per unit hour) can be calculated from the XPS analysis in consideration of an atomic sensitivity factor to calculate the number of atoms in non-stoichiometric Ti (hereinafter, $Ti^{y+}$ ($y \leq 3$)) and V (hereinafter, $V^{x+}$ ($x \leq 4$)) species per unit volume (cm³) of the catalyst. The present inventors have found that the calculated number of atoms per unit volume (atoms/cm³) of the non-stoichiometric chemical species per unit volume, represented by $Ti^{y+}$ ($y \leq 3$) and $V^{x+}$ ($x \leq 4$), has a strong relationship with the NOx removal activity of the catalyst. This can explain the excellent NOx removal activity of the catalyst prepared through ball milling in the present invention.

According to the present invention, the reaction activity of the catalyst is greatly influenced by the content of vanadium as an active ingredient. In the present invention, the amount of vanadium loaded on the titania support is preferably maintained within the range of about 0.5-10 wt %, and more preferably about 0.5-5 wt %, based on the weight of titania. In this respect, if the content of vanadium is excessively low, the selective reduction activity of the catalyst for NOx will be reduced, so that the catalyst cannot perform the required catalytic function. On the other hand, if the content of vanadium is excessively high, the ability of the catalyst to oxidize sulfur dioxide is increased, thus causing catalytic poisoning. For these reasons, the content of vanadium needs to be suitably controlled.

According to the present invention, the redox ability of the catalyst can be evaluated through oxygen ($O_2$) on/off experiments.

Examples of oxygen, which can participate in the SCR reaction, typically include gaseous oxygen, lattice oxygen and the oxygen of NO. Because NO does not participate in the SCR reaction due to its decomposition into nitrogen and oxygen, gaseous oxygen and lattice oxygen are inferred to participate in the SCR reaction. These forms of oxygen show different reactions, including the case in which lattice oxygen participates in the reaction and is supplemented with gaseous oxygen, and the case in which gaseous oxygen participates directly in the reaction. Also, the oxidation state of the catalyst can be changed without the participation of oxygen in the reaction. The degree of the participation of gaseous oxygen and lattice oxygen in the reaction can be evaluated through on/off experimentation on gaseous oxygen, and this evaluation will now be briefly described.

The catalyst is pretreated at 400° C. in an air atmosphere for 1 hour to eliminate the effect of water adsorbed on the catalyst and of oxidation states, and then 3% oxygen, 800 ppm NOx, and ammonia in an amount corresponding to an $NH_3/NOx$ molar ratio of 1 are injected into a reaction system, while an SCR reaction is performed at the corresponding temperature to measure the NOx conversion rate. The injection of gaseous oxygen is interrupted for 1 hour to monitor the change in NOx concentration, and then the same amount of oxygen is fed into the reaction system to determine the NOx conversion rate from the change in NOx concentration. In a normal-state SCR reaction, when the supply of gaseous oxygen is interrupted, the NOx conversion rate rapidly decreases at the initial stage of interruption, and then the decreasing tendency slows down with the passage of time. When oxygen is supplied into the reaction system, a tendency to recover the initial activity is shown. Thus, the fact that reaction activity is somewhat maintained even in the absence of gaseous oxygen suggests that oxygen in the catalyst lattice participates in the reaction. Thus, excellent reaction activity of the catalyst according to the present invention can be demonstrated through the reduction potential of the catalyst.

In the meantime, to use the catalyst prepared according to the method comprising the ball milling process, the catalyst can be coated on structures, such as metal plates, metal fibers, ceramic filters or honeycombs, or coated on air preheaters, boiler tube bundles, ducts, or walls. Also, a small amount of a binder is added to the catalyst, and then the catalyst can be extruded in the form of granules or monoliths. In order to prepare the catalyst in the coated or extruded form as described above, the catalyst is preferably uniformly ground to have a particle size of about 1-10 μm, and is coated or extruded according to a process widely known in the art. However, if the particle size is excessively small, it is disadvantages in terms of economic efficiency because a fine grinding step is required, and if the particle size is excessively large, the uniformity and adhesion of the coated or extruded material will be reduced. For this reason, it is preferable to prepare particles having a suitable size.

The catalyst prepared according to the present invention is effectively applied for the removal of nitrogen oxides from flue gas, in which the nitrogen oxide-containing flue gas is subjected to selective catalytic reduction in the presence of the catalyst, along with ammonia as a reducing agent, in conditions of a temperature of about 150-450° C., and preferably about 180-400° C., and gas hourly space velocity (GHSV) of about 1,000-120,000 $hr^{-1}$, and preferably 5,000-100,000 $hr^{-1}$. Particularly, the catalyst according to the present invention exhibits high denitrification performance in a low-temperature range of 180-250° C. compared to the prior $V_2O_5$/titania-based catalyst, and thus can show excellent activity over a wide temperature range. Also, the catalyst prepared according to the present invention is particularly suitable for the treatment of flue gas containing less than 20 vol % of water and less than 500 ppm of sulfur dioxide. Sulfur dioxide contained in flue gas is oxidized into sulfur trioxide on the catalyst surface, and the sulfur trioxide reacts with water and unreacted ammonia to form solid ammonium sulfate and liquid ammonium bisulfate, which are sticky materials, which are deposited on the catalytic layer and the downstream systems, are highly corrosive, and prevent heat transfer. Furthermore, a large amount of ammonium sulfate is produced at a temperature lower than 200° C., at which it does not decompose, and thus pore plugging and a rapid decrease in SCR activity result. In order to inhibit the inactivation of the catalyst, caused by the presence of such sulfur oxide, the oxidation of sulfur oxide and the emission of unreacted ammonia should be able to be inhibited, or the produced salts should be able to be decomposed at a lower temperature. In connection with this, the catalyst according to the present invention can be evaluated with respect to resistance to sulfur dioxide, according to Example 6, as described below.

For the selective reduction and removal of nitrogen oxides, ammonia is typically used as a reducing agent in which case the $NH_3/NOx$ molar ratio is preferably controlled within the range of about 0.6-1.2, and more preferably 0.8-1.1. If the $NH_3/NOx$ molar ratio is excessively low, nitrogen oxide removal efficiency is reduced due to the lack of the reducing agent, and if the $NH_3/NOx$ molar ratio is excessively high, unreacted ammonia is emitted. Particularly, if nitrogen oxides in flue gas containing sulfur oxides such as sulfur dioxide are to be removed, the emission of unreacted ammonia should be minimized, such that catalyst poisoning caused by the production of ammonium sulfate can be effectively prevented. The source of ammonia, which is used as a reducing agent, is not specifically limited, as long as it can be converted into ammonia in a selective reduction reaction and can participate in the reaction; however, ammonia water, ammonia gas and/or urea can preferably be used.

MODE FOR INVENTION

The present invention can be more clearly understood with reference to the following examples. It is to be understood, however, that these examples are for illustrative purposes only and that the scope of the present invention is not limited thereto.

Preparation 1

1.36 g of ammonium metavanadate ($NH_4VO_3$) was dissolved in distilled water heated to 60° C. At this time, in order to increase solubility and control the oxidation states of vanadium, oxalic acid was added in portions thereto and dissolved therein. Titania was added to the aqueous solution to prepare slurry, and the slurry was heated at 70° C. in a vacuum evaporator with stirring and dried at a temperature of 100° C. for 24 hours. Then, the dried slurry was calcined at a temperature of 400° C. in an air atmosphere, thus preparing a catalyst. The calcined catalyst was sieved and used in experiments.

The catalyst prepared as described above was analyzed using an elemental analyzer (Optima 3000XL, Perkin Elmer). As a result, it could be seen that 3 wt %, based on the weight of titania, of vanadium was loaded on the catalyst. Table 1 below shows the physical properties of the titania support used in the present invention.

TABLE 1

| Titania | Anatase:rutile (%:%) | Specific surface area (m³/g) | Particle size (nm) | Tungsten (wt %) |
|---|---|---|---|---|
| TiO$_2$(A) | 100:0 | 92 | 24 | 0.1 |
| TiO$_2$(B) | 100:0 | 94 | 22 | 8.65 |
| TiO$_2$(C) | 100:0 | 106 | 22 | 6.5 |
| TiO$_2$(D) | 100:0 | 73 | 23 | 4.48 |
| TiO$_2$(E) | 100:0 | 134 | 15 | 0 |
| TiO$_2$(F) | 98:2 | 13 | 54 | 0 |
| TiO$_2$(G) | 4:96 | 4 | 55 | 0 |

Inventive Preparation 1

In this Example, a planetary ball milling process, among ball milling processes, was applied to prepare a denitrification catalyst according to the present invention. The preparation method of the catalyst was as follows, and the processes up to the drying process were carried out in the same manner as in Preparation 1. 20 g of the dried sample was placed in a support disk (2 liters) made of zirconia, together with zirconia balls having sizes of 20 mm, 10 mm and 5 mm, and was then subjected to ball milling for 3 hours. Herein, in order to obtain the maximum efficiency, the ball powder mass ratio (BPMR) was adjusted to 50:1, and the rotational speed was 340 rpm. The resulting sample was calcined at a temperature of 400° C. in an air atmosphere for 4 hours, and then sieved through a #40-50 sieve.

Inventive Preparation 2

In this Example, the planetary ball milling in the catalyst preparation process according to Inventive Preparation 1 was carried out after calcining the dried sample. With respect to the preparation method of this Example, processes up to the drying process were carried out in the same manner as in Preparation 1. The dried sample was calcined at a temperature of 400° C. in an air atmosphere for 4 hours, and then 20 g of the calcined sample was placed in a support disk (2 liters) made of zirconia together with zirconia balls having sizes of 20 mm, 10 mm and 5 mm, and then subjected to ball milling for 3 hours. Herein, in order to realize maximum efficiency, the ball powder mass ratio (BPMR) was adjusted to 50:1, and the rotational speed was 340 rpm. The resulting sample was sieved through a #40-50 sieve.

Inventive Preparation 3

In this Example, an attrition ball milling process, among ball milling processes, was applied to prepare a denitrification catalyst according to the present invention. The preparation method of the catalyst was as follows, and 20 g of the catalyst sample calcined according to Preparation 1 was placed in a support disk (2 liters) made of stainless steel together with zirconia balls having sizes of 20 mm, 10 mm and 5 mm, and then subjected to ball milling for 1 hour. Herein, in order to realize maximum efficiency, the ball powder mass ratio (BPMR) was adjusted to 50:1, and the rotational speed was 500 rpm. The resulting sample was calcined at a temperature of 400° C. in an air atmosphere for 4 hours, and then sieved through a #40-50 sieve.

The methods of the above-described Preparation 1 and Inventive Preparations 1-3 are summarized in Table 2 below.

TABLE 2

| | Preparation method |
|---|---|
| Preparation 1 | Wet drying evaporation (loading of 3 wt % of vanadium → drying → calcinations) |
| Inventive Preparation 1 | Loading of 3 wt % of vanadium → drying → planetary ball milling → calcination |
| Inventive Preparation 2 | Loading of 3 wt % of vanadium → drying → calcination → planetary ball milling |
| Inventive Preparation 3 | Loading of 3 wt % of vanadium → drying → calcination → attrition ball milling |

Comparative Preparation 1

In order to analyze the effect of processing parameters in the application of the ball milling process to the preparation process of the denitrification catalyst, a catalyst was prepared by changing the BPMR in the preparation process of the catalyst according to the method of Inventive Preparation 2. The catalyst was prepared in the following manner.

The processes up to the drying process were carried out in the same manner as in Preparation 1, except that the loading amount of vanadium was 1.5 wt %. The dried sample was calcined at a temperature of 400° C. in an air atmosphere for 4 hours. The calcined sample was placed in a support disk (2 liters) made of stainless steel, together with zirconia balls having sizes of 20 mm, 1 mm and 5 mm, and was then subjected to ball milling for 3 hours. Herein, BPMR was variously changed to 0, 10:1, 30:1 and 50:1, and the resulting catalyst powder was sieved through a #40-50 sieve.

Comparative Preparation 2

A catalyst was prepared by changing the size of balls in the ball-milling step in the catalyst preparation according to the method of Inventive Preparation 2. The catalyst was prepared in the following manner.

The processes up to the drying process were carried out in the same manner as in Preparation 1, except that the loading amount of vanadium was 1.5 wt %. The dried sample was calcined at a temperature of 400° C. in an air atmosphere for 4 hours. The calcined sample was placed in a support disk (2 liters) made of stainless steel, together with zirconia balls, and then subjected to ball milling at a fixed BPMR of 50:1 and a rotational speed of 340 rpm for 3 hours. Herein, the size of the balls was changed to 0 mm, 5 mm, 10 mm and 20 mm, and the resulting catalyst powder was sieved through a #40-50 sieve.

Comparative Preparation 3

A catalyst was prepared by changing the ball milling time in the ball-milling step in the catalyst preparation according to the method of Inventive Preparation 2. The catalyst was prepared in the following manner.

The processes up to the drying process were carried out in the same manner as in Preparation 1, except that the loading amount of vanadium was 3 wt %. The dried sample was calcined at a temperature of 400° C. in an air atmosphere for 3 hours. The calcined sample was placed in a support disk (2 liters) made of stainless steel, together with zirconia balls having sizes of 20 mm, 10 mm and 5 mm, and then subjected to ball milling at a fixed BPMR of 50:1 and a rotational speed of 340 rpm. Herein, the ball milling time was set within the range of 0-9 hours, and the resulting catalyst powder was sieved through a #40-50 sieve.

EXAMPLE 1

Figure 3:
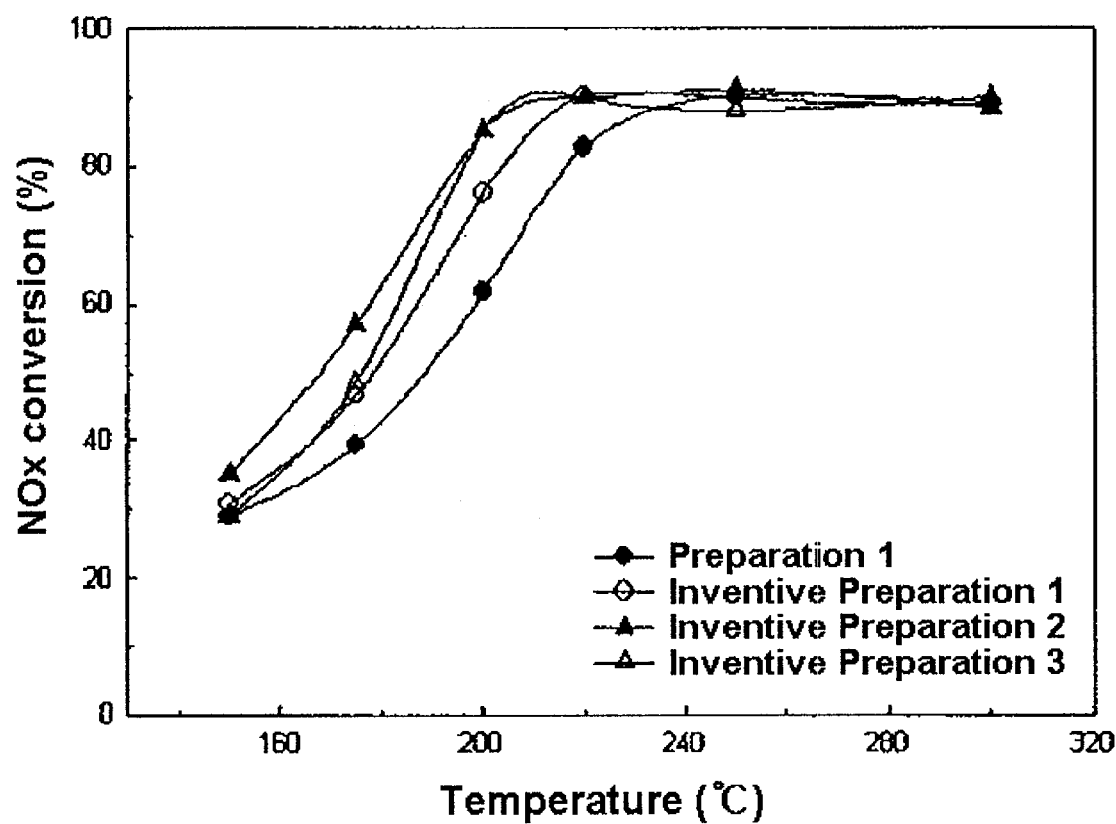
FIG. 3 shows NOx conversion versus temperature for catalysts prepared using the methods of Preparation 1 and Inventive Preparations 1 to 3 according to Example 1.

In the catalyst preparation according to the present invention, the effect of the application of the ball milling process on NOx removal activity is considered to be very high. Thus, in order to observe the change in reaction activity and determine an optimal preparation method, catalysts were prepared using the TiO$_2$ (A) support according to Preparation 1 and Inventive Preparations 1-3, and the prepared catalysts were subjected to NOx removal experiments at various reaction temperatures. The results of the comparison of NOx conversion between Preparation 1 and Inventive Preparations 1-3 are shown in FIG. 3. Herein, the temperature of a reactor was varied between 150° C. and 300° C., the concentration of supplied NOx was 800 ppm, and the NH$_3$/NOx molar ratio was 1.0. Also, the concentration of oxygen was maintained at 3 vol %, the concentration of water was maintained at 8 vol %, and the gas hourly space velocity was maintained at 60,000 hr$^{+1}$. In order to eliminate the effect of oxidation states and of water adsorbed on the catalysts before the reaction, the catalysts were maintained at a temperature of 400° C. in an air atmosphere for 1 hour, and were then cooled to the reaction temperature before conducting the experiments.

Referring to FIG. 3, the catalyst according to Preparation 1, which was prepared according to the conventional catalyst preparation method, showed a high denitrification efficiency of more than 90% in a high-temperature region, but showed a rapid decrease in NOx conversion rate starting from temperatures lower than 250° C. However, in the case of the catalyst according to Inventive Preparation 1, NOx removal activity in a low-temperature range was increased. Particularly, the catalysts according to Inventive Examples 2 and 3 showed an increase of about 15-20% in conversion in a low-temperature range, compared to the catalyst of Preparation 1, even though they did not show a difference from the catalyst of Preparation 1 at high temperatures due to high activity. Thus, from an increase in the NOx removal activity of the catalyst, prepared through ball milling, it could be seen that the object of the present invention was achieved.

Also, catalysts were prepared using the TiO$_2$ (A) through TiO$_2$ (G) supports of Table 1 above according to Preparation 1 and Inventive Preparations 2 and 3, and were subjected to experiments under the above-described conditions. The results of comparison of NOx conversion at varying temperatures between the catalysts are shown in Table 3.

In the case of the catalysts prepared according to Inventive Preparations 2 and 3, the increase in activity is greatly divided into an increase at a low temperature of 200° C. and an increase at a high temperature of more than 250° C. The catalysts showing an increase in activity at low temperatures are catalysts prepared using the TiO$_2$ (A) to TiO$_2$ (D) supports for the prior selective reduction catalysts. The catalysts showing a distinct increase in activity at high temperatures are catalysts prepared using the TiO$_2$ (E) to TiO$_2$ (G) supports, having a very high or very low specific surface area.

Such results suggest that the physical properties of the catalysts were changed due to ball milling depending on the inherent physical and chemical properties of TiO$_2$, and thus the activities of the catalysts were changed. Although the catalyst according to the present invention is characterized in that it shows excellent denitrification activity even at low temperatures as a result of introducing the ball milling step into the catalyst preparation process, it showed excellent denitrification activity over a wide temperature range, including not only low temperatures, but also high temperatures. When the catalysts, prepared using the TiO$_2$ (A) to TiO$_2$ (D) supports, were subjected to ball milling, they showed no substantial change in activity thereof at high temperatures, because they already had excellent activity at high temperatures of more than 300° C., but they showed an increase in activity thereof at low temperatures of less than 250° C. However, the catalysts prepared using the TiO$_2$ (E) to TiO$_2$ (G) supports are catalysts showing low activity over the entire temperature range, and when they were subjected to ball milling, the increase in the activity thereof at high temperatures was not so high. However, it could be seen that the activity thereof over a wide temperature range including low temperatures was increased by the introduction of the ball milling step. In fact, the catalysts prepared using the TiO$_2$ (E) to TiO$_2$ (G) supports are not considered to show a satisfactory increase in activity thereof at high temperatures and low temperatures, even when they are subjected to ball milling, and thus these catalysts are not regarded to be the denitrification catalysts intended in the present invention. However, ball milling can have technical significance in that it increases the redox characteristics depending on the characteristics of the titania supports used, thus changing the surface structures of catalysts at low temperatures, such that the catalysts show an increase in the activity thereof at high temperatures.

TABLE 3

| | | NOx conversion (%) | | |
|---|---|---|---|---|
| | Temperature (° C.) | Preparation 1 | Inventive Preparation 2 | Inventive Preparation 3 |
| V/TiO$_2$(A) | 150 | 29 | 35 | 29 |
| | 175 | 39 | 57 | 49 |
| | 200 | 62 | 85 | 85 |
| | 220 | 83 | 90 | 90 |
| | 250 | 90 | 91 | 90 |
| | 300 | 89 | 88 | 88 |
| V/TiO$_2$(B) | 150 | 32 | 32 | 31 |
| | 175 | 44 | 51 | 47 |
| | 200 | 66 | 83 | 69 |
| | 220 | 87 | 90 | 92 |
| | 250 | 89 | 89 | 85 |
| | 300 | 86 | 88 | 83 |
| V/TiO$_2$(C) | 150 | 28 | 31 | 26 |
| | 175 | 39 | 51 | 38 |
| | 200 | 59 | 75 | 59 |
| | 220 | 83 | 90 | 82 |
| | 250 | 89 | 92 | 90 |
| | 300 | 92 | 92 | 90 |
| V/TiO$_2$(D) | 150 | 30 | 31 | 29 |
| | 175 | 37 | 46 | 41 |
| | 200 | 57 | 77 | 68 |
| | 220 | 85 | 90 | 87 |
| | 250 | 90 | 90 | 88 |
| | 300 | 91 | 89 | 89 |
| V/TiO$_2$(E) | 150 | 23 | 24 | 22 |
| | 175 | 25 | 27 | 25 |
| | 200 | 30 | 33 | 35 |
| | 220 | 37 | 43 | 51 |
| | 250 | 53 | 67 | 81 |
| | 300 | 85 | 89 | 77 |
| V/TiO$_2$(F) | 150 | 23 | 18 | 25 |
| | 175 | 23 | 26 | 28 |
| | 200 | 27 | 30 | 37 |
| | 220 | 28 | 36 | 45 |
| | 250 | 33 | 48 | 70 |
| | 300 | 41 | 65 | 85 |
| V/TiO$_2$(G) | 150 | 23 | 23 | 23 |
| | 175 | 24 | 25 | 26 |
| | 200 | 24 | 26 | 33 |
| | 220 | 26 | 30 | 42 |
| | 250 | 31 | 39 | 66 |
| | 300 | 48 | 65 | 91 |

EXAMPLE 2

The ball milling process, which is the primary characteristic of the present invention, is a process in which a combination of various parameters should be optimized. In this step, parameters, including the type and kind of milling, the speed and time of milling, the kind and size of balls, and the ratio of balls to powder, need to be considered. Such parameters are mutually adjusted. The effect of the parameters on the ball milling process needs to be considered, and when the high-activity denitrification catalyst prepared according to the present invention is applied in actual processes, mass production thereof will be required, and thus the analysis thereof is required.

In order to find the effect of BPMR (ball/powder weight ratio among the ball milling process parameters) on denitrification activity, catalysts were prepared using the $TiO_2$ (D) support according to Comparative Preparation 1 while changing BPMR, and were measured with respect to NOx conversion rate at varying temperatures. The results are shown in FIG. 4.

Figure 4:
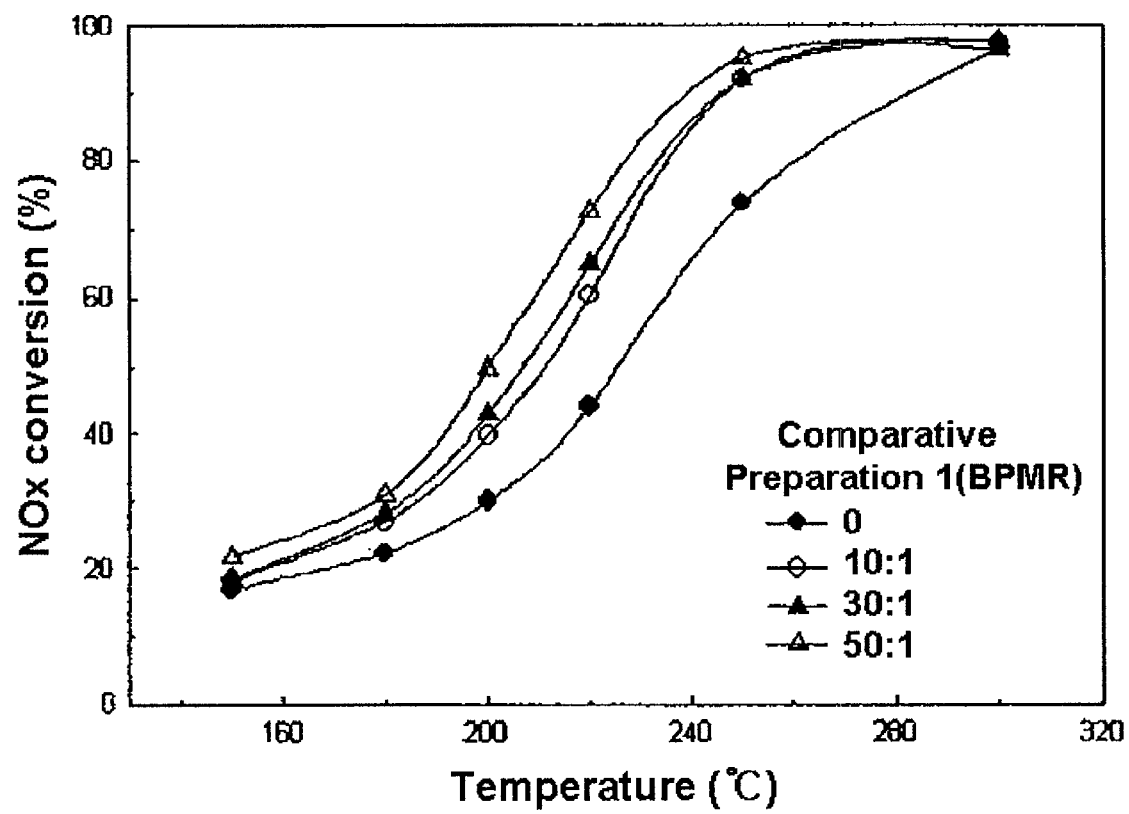
FIGS. 4 to 6 show NOx conversion versus temperature for catalysts prepared by changing the ball powder mixing ratio (BPMR), ball size and ball milling time in each of Comparative Preparations 1 to 3 according to Example 2.

As can be seen in FIG. 4, the denitrification performance of the catalyst was greatly increased through the ball milling process, and the increasing tendency was further increased with an increase in BPMR. This suggests that the number of powder agglomerates per unit time was increased, such that more energy was transferred to powder. Thus, the adjustment of BPMR to a higher level can lead to an increase in denitrification activity and a reduction in process time.

Figure 5:
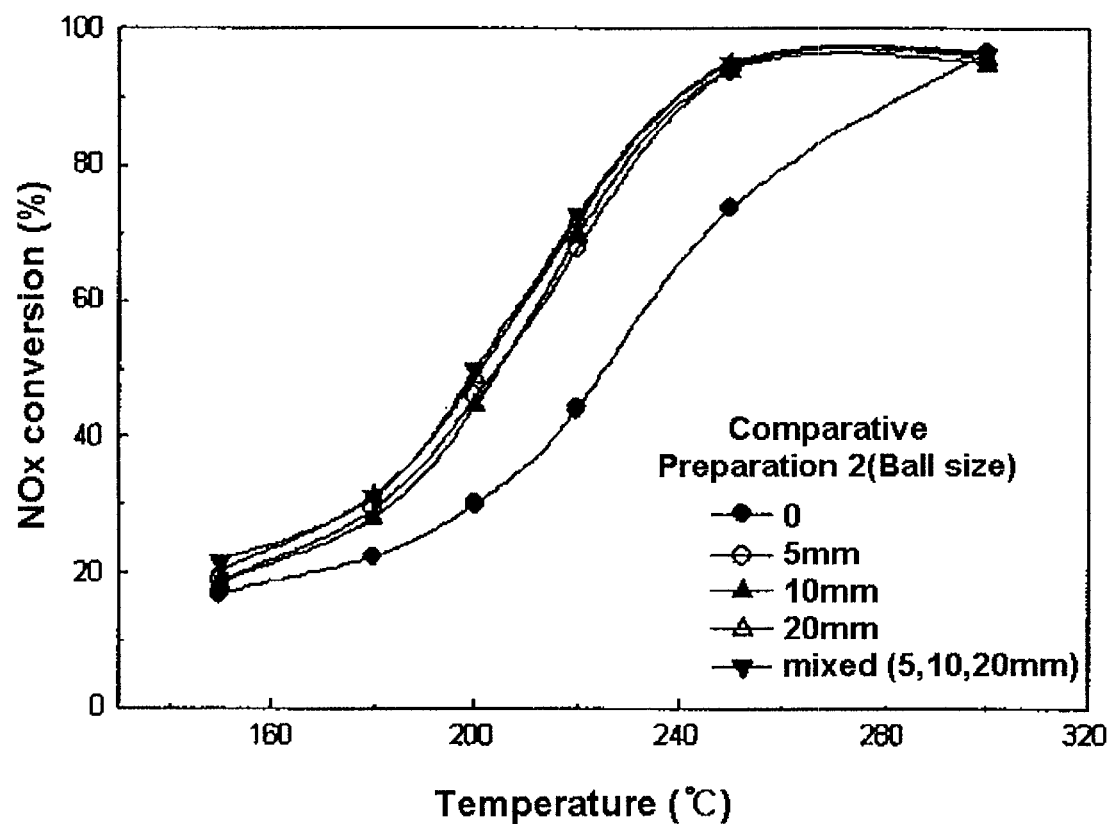

The size of the balls as media for transferring energy to powder can also influence the milling process efficiency. To confirm this, catalysts were prepared using the $TiO_2$ (D) support according to Comparative Preparation 2 while the size of balls was changed, and were measured for NOx conversion rate under the same conditions as in Example 1. The results are shown in FIG. 5. Generally, balls having a higher weight transfer higher energy to powder, and thus balls having a large diameter or high density, are useful in the ball milling process. However, referring to FIG. 5, an increase in denitrification activity has no substantial relationship with the size of balls. That is, even when small balls are used, a high-activity denitrification catalyst can be prepared, because the transfer of sufficient energy to the catalyst is possible.

Figure 6:
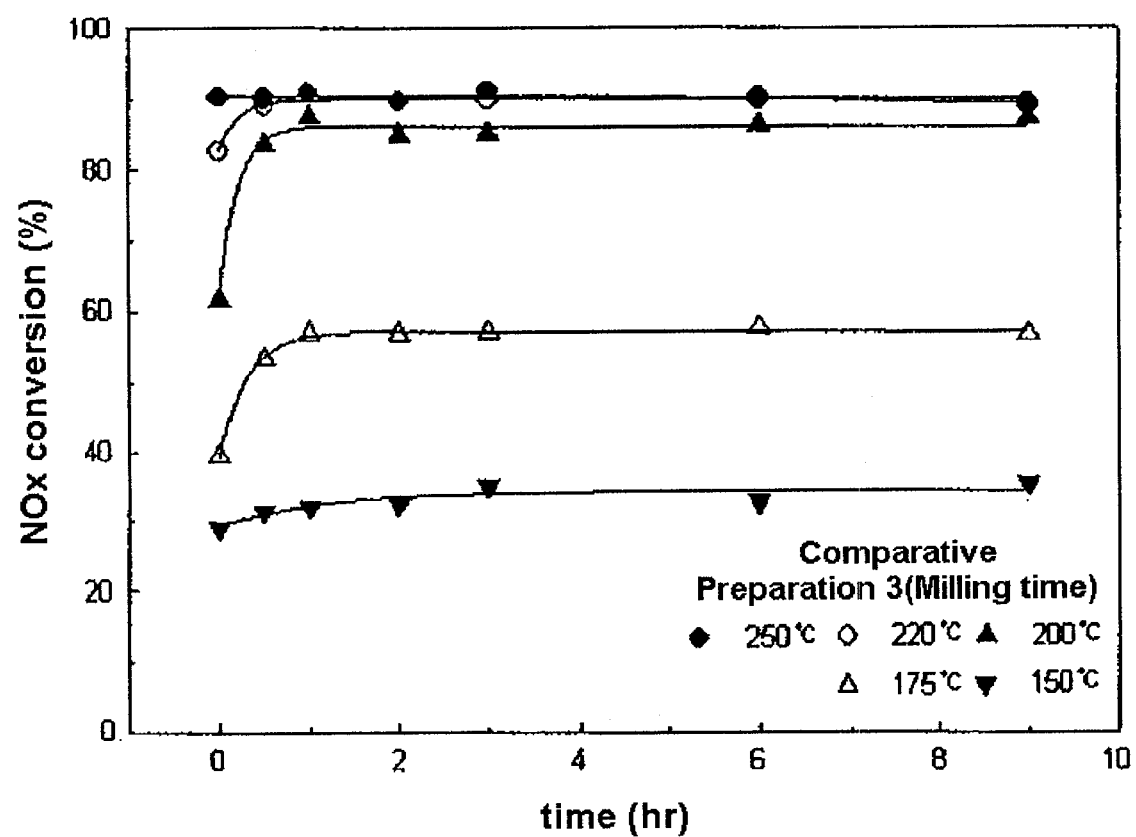

In the ball milling process, the milling time acts as a very important parameter, because the particle size and specific area of a catalyst are changed during the energy transfer process. The effect of the milling time can be seen from a change in denitrification activity with a change in the milling time, and thus a catalyst was prepared using the $TiO_2$ (A) support according to Comparative Preparation 3. Then, the catalyst was subjected to experiments in the same manner, as in Example 1, and the experimental results are shown in FIG. 6. Referring to FIG. 6, although an increase in reaction activity through the ball milling process was slightly different between reaction temperatures, the increase in reaction activity appeared 30 minutes after the start of the milling process, and the activity was subsequently maintained constant.

Accordingly, when the preparation of the high-activity denitrification catalyst through the ball milling process according to the present invention is applied to actual processes, an increase in the denitrification activity of the catalyst could be expected. Also, the above-described process parameters can be adjusted in consideration of efficiency and economy.

EXAMPLE 3

The loading amount of vanadium as a catalytic active ingredient can have an effect on the increase in reaction activity through the ball milling of the present invention.

Generally, the activity of a selective reduction catalyst is greatly influenced by the content of vanadium as an active ingredient, and an increase in the vanadium content leads to an increase in activity, but when vanadium is loaded in an amount greater than a suitable amount, the catalytic activity can be decreased rather than being increased. Also, an increase in the vanadium content leads to an increase in the oxidation potential of the catalyst, and thus when sulfur dioxide is present in flue gas, $NH_4HSO_4$ and $(NH_4)SO_4$ salts are produced due to an increase in the oxidation potential of sulfur dioxide into sulfur trioxide.

In order to analyze the effect of the vanadium content and determine the optimal loading amount of vanadium in the preparation of a high-activity denitrification catalyst, catalysts were prepared using the $TiO_2$ (A) support according to Preparation 1 and Inventive Preparations 1-3 while the vanadium content was changed to 2-5 wt %, and were measured with respect to $NO_X$ conversion rate versus temperature under the same conditions as in Example 1. The measurement results are shown in FIG. 7.

Figure 7:
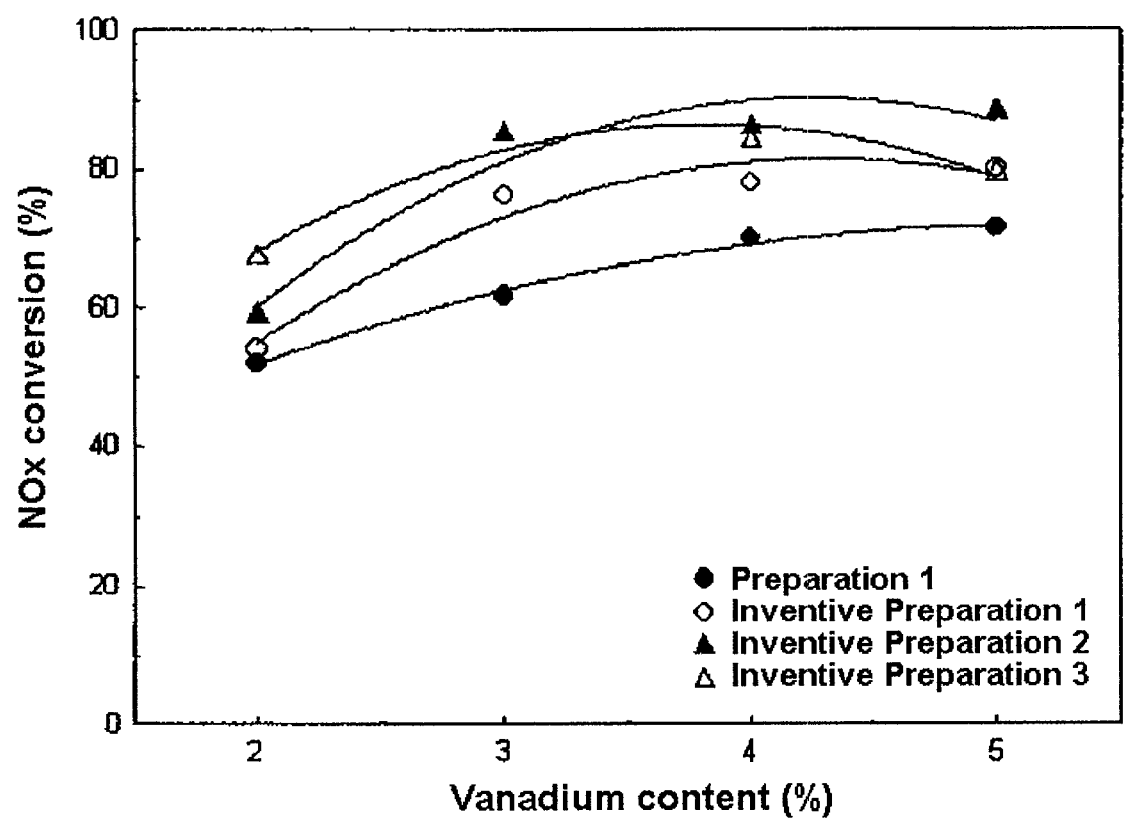
FIG. 7 is a diagram showing NOx conversion versus loaded vanadium content at a reaction temperature of 200° C. for catalysts prepared in Preparation 1 and Inventive Preparations 1 to 3.

FIG. 7 shows the $NO_X$ conversion rate measured at 200° C., and, as can be seen in FIG. 7, the catalyst according to Preparation 1 showed an increase in denitrification efficiency with an increase in the vanadium content due to an increase in vanadium sites, which acted as active sites for selective reduction. However, the catalysts prepared according to Inventive Preparations 1-3 showed a great change in activity with the vanadium content, and the increase in reaction activity was greater at 3 wt % than at 2 wt % compared to the catalyst according to Preparation 1.

EXAMPLE 4

In order to measure the species and distribution of titanium and vanadium oxides formed on the surface of catalysts, an XPS analyzer (ESCALAB 201, VG Scientific Co.) was used.

Figure 8:
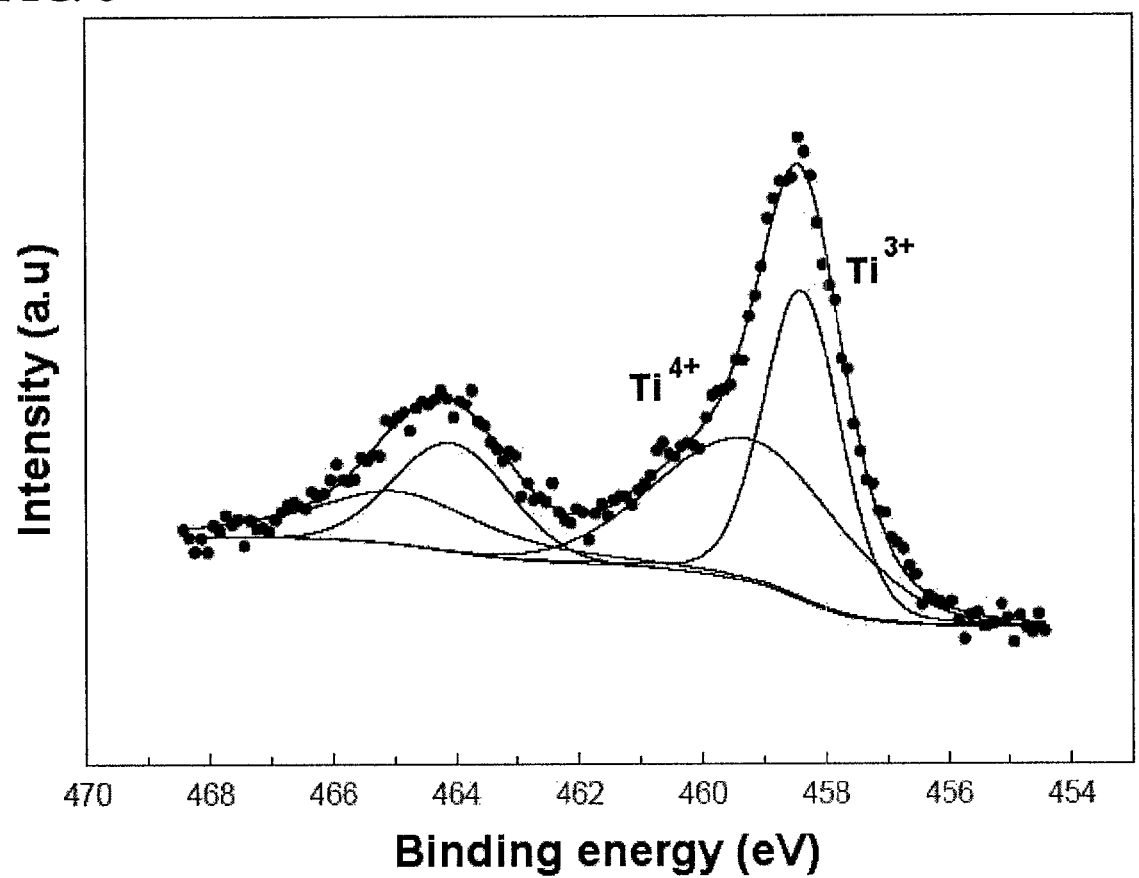
FIGS. 8 and 9 are diagrams showing XPS analysis results for the kind and distribution ratio of titanium oxides in a catalyst prepared in each of Preparation 1 and Inventive Preparation 2 according to Example 4.
Figure 9:
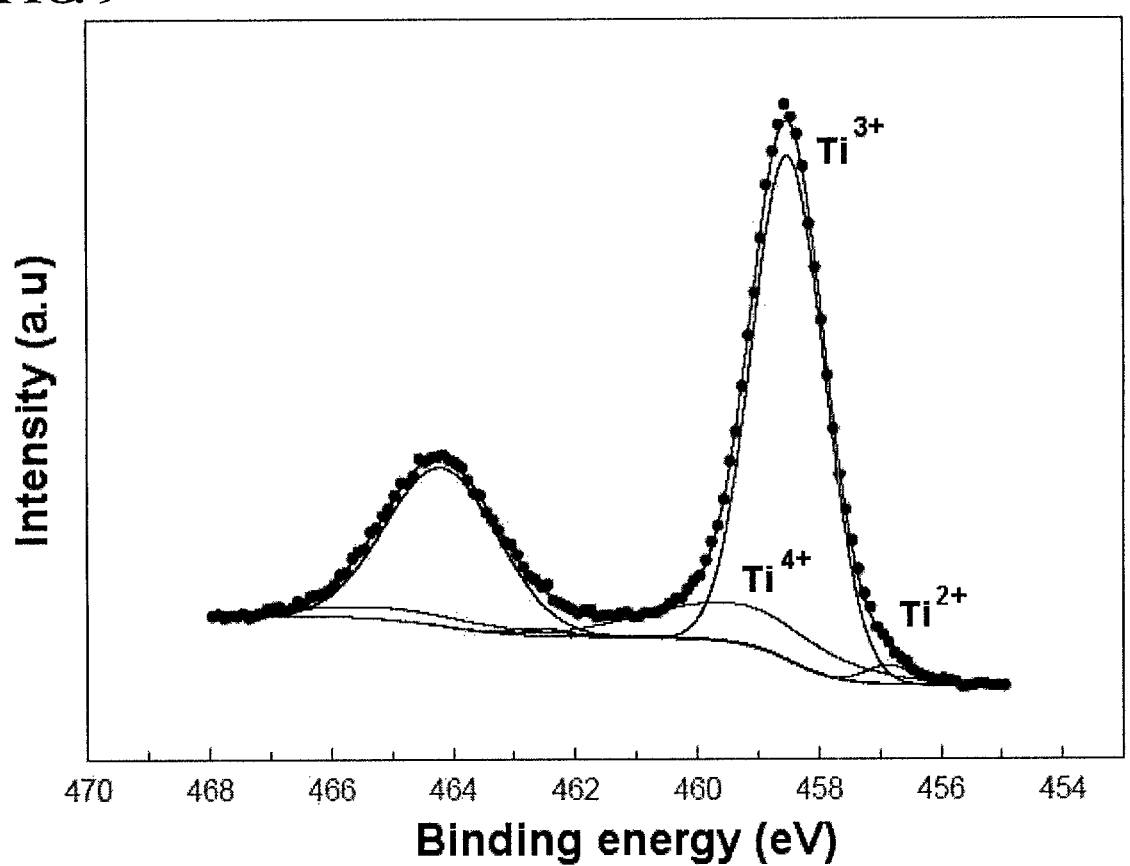
Figure 10:
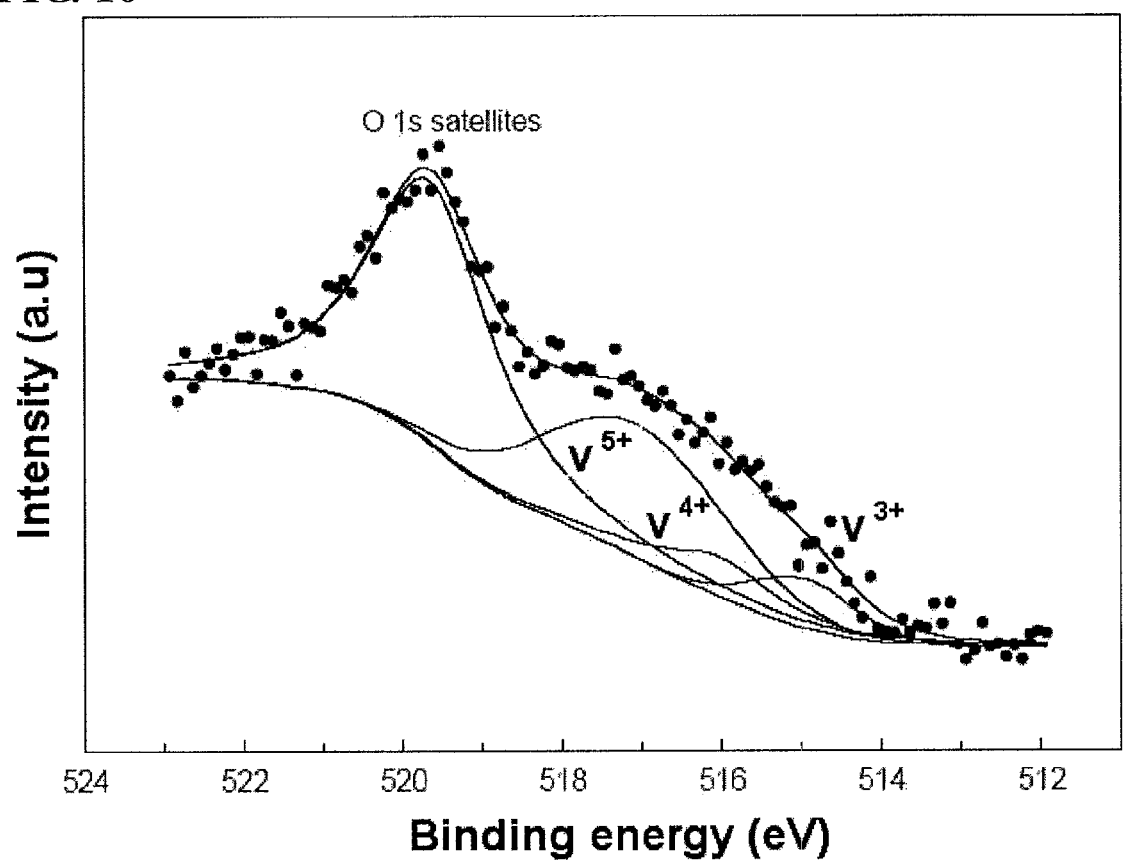
FIGS. 10 and 11 are diagrams showing XPS analysis results for the kind and distribution ratio of vanadium oxides in a catalyst prepared in each of Preparation 1 and Inventive Preparation 2 according to Example 4.
Figure 11:
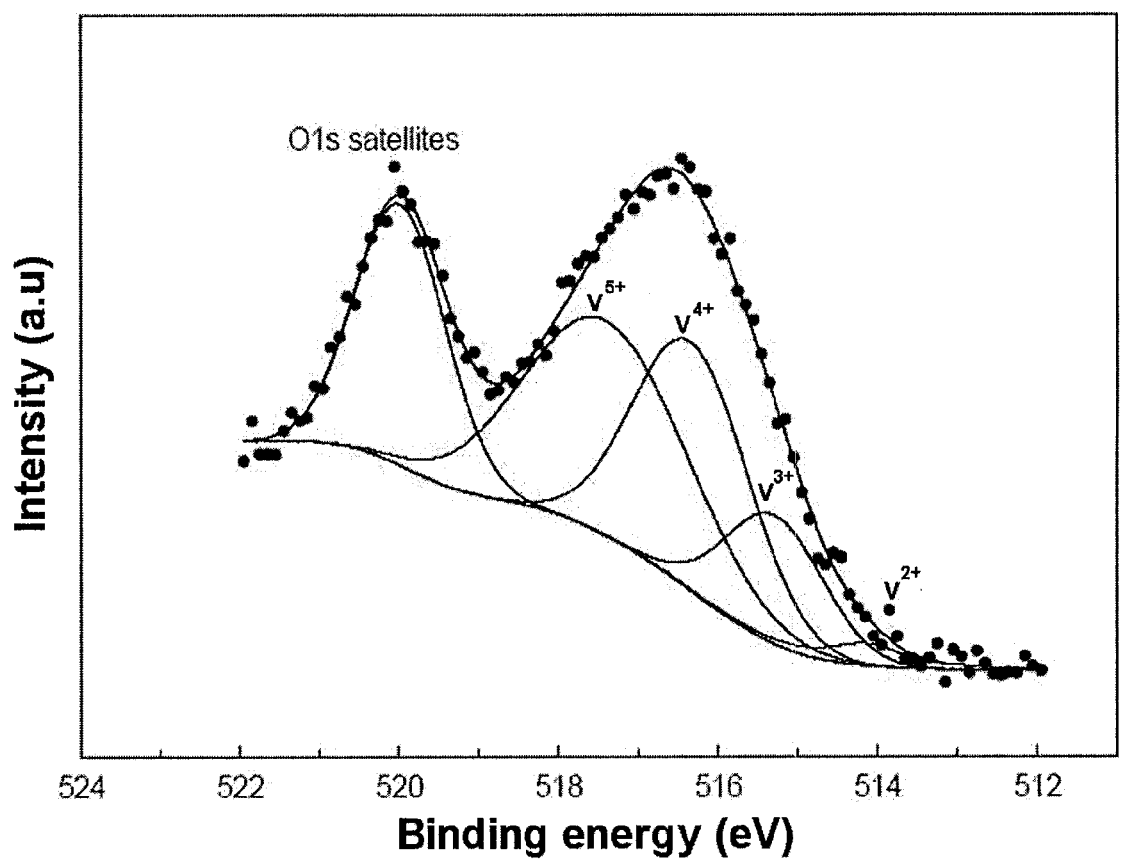

The XPS analysis results of Ti 2p, before and after ball milling for catalysts prepared using the $TiO_2$ (A) support according to Preparation 1 and Inventive Preparation 2, are shown in FIGS. 8 and 9, and the XPS analysis results of V 2p are shown in FIGS. 10 and 11. As can be seen in FIGS. 8 and 9, when vanadium was loaded on the $TiO_2$ support, containing only $Ti^{4+}$, titanium, having various oxidation states, including $Ti^{3+}$ in addition to $Ti^{4+}$, was present on the support. In the case of the catalyst prepared according to Inventive Preparation 2, the intensity of produced $Ti^{3+}$ was greatly increased and the presence of $Ti^{2+}$ having a higher oxidation states was also observed.

As can be seen in FIGS. 10 and 11, vanadium oxides in addition to titanium oxides were produced on the catalyst loaded with vanadium. The catalyst according to Inventive Preparation 2 showed a great increase in the intensity of $V^{4+}$ and $V^{3+}$ compared to the catalyst according to Preparation 1, and the presence of $V^{2+}$ could also be observed in the catalyst of Inventive Preparation 2.

Thus, it could be seen that the presence of non-stoichiometric compounds, including $Ti^{3+}$, $Ti^{2+}$, $V^{3+}$, $V^{3+}$ and $V^{2+}$, had an effect on selective catalytic reduction in every form. For the quantitative analysis of each of the elements, the number of atoms per unit volume (atoms/$cm^3$) of titanium and vanadium oxides in the catalysts prepared using the $TiO_2$ (A) to $TiO_2$ (G) supports of Table 1 above according to Preparation 1 and Inventive Preparations 2 and 3 was calculated, and the calculation results are shown in Table 4. Referring to FIG. 7, the catalysts having high NOx removal activity, which are catalysts prepared by applying high energy according to Inventive Preparations 2 and 3, showed a great increase in the number of atoms in non-stoichiometric chemical species, and this increase in number of atoms was consistent with an increase in activity at the corresponding reaction temperature. In consideration of this fact, it could be seen that an increase in the number of atoms in non-stoichiometric chemical species, that is, $Ti^{y+}$ ($y \leqq 3$) and $V^{x+}$ ($x \leqq 4$), leads to an increase in reaction activity at low temperatures.

even in the absence of gaseous oxygen indicates that the lattice oxygen of the catalysts participated in the reaction. This participation of lattice oxygen in the reaction has a close

TABLE 4

| Catalyst | $V^{4+} + V^{3+} + V^{2+}$ (atoms/cm$^2$) | | | $Ti^{3+} + Ti^{2+}$ (atoms/cm$^2$) | | |
|---|---|---|---|---|---|---|
| | Preparation 1 | Inventive Preparation 2 | Inventive Preparation 3 | Preparation 1 | Inventive Preparation 2 | Inventive Preparation 3 |
| V/TiO$_2$(A) | 157 | 416 | 380 | 1444 | 3428 | 3215 |
| V/TiO$_2$(B) | 246 | 334 | 321 | 1533 | 2986 | 3028 |
| V/TiO$_2$(C) | 195 | 331 | 320 | 1185 | 2610 | 1896 |
| V/TiO$_2$(D) | 299 | 347 | 352 | 2532 | 3014 | 3005 |
| V/TiO$_2$(E) | 101 | 266 | 230 | 467 | 3515 | 3263 |
| V/TiO$_2$(F) | 100 | 221 | 260 | 131 | 2586 | 2233 |
| V/TiO$_2$(G) | 133 | 208 | 230 | 374 | 1963 | 2133 |

However, the catalysts did not show a change in the activity thereof at a high temperature of more than 250° C., despite an increase in the number of atoms in non-stoichiometric chemical species. As a result, it was considered that the non-stoichiometric chemical species require drivable activation energy, and, due to the production and increase of such non-stoichiometric chemical species, the catalysts can generate highly reactive free electrons as a result of the reduction of atoms, and thus maintain high activity even at low reaction temperatures.

EXAMPLE 5

An SCR reaction in a normal state requires a temperature at which activation energy can be driven, and the adsorption and desorption of reactants on a catalyst can smoothly occur, so that the interaction between the reactants can smoothly occur. That is, a selective catalytic reduction reaction is an electron acceptor reaction, which can be explained by the reaction characteristics of a catalyst. To analyze the change in the reduction potential of a catalyst treated with high energy, the catalysts prepared using the TiO$_2$ (A) to TiO$_2$ (G) supports of Table 1 above were subjected to an oxygen on/off experiment. The degree of the participation of lattice oxygen of the catalysts in an SCR reaction could be analyzed through the oxygen on/off experiment in an SCR reaction system, and the experiment was conducted under conditions of reaction temperature of 200° C. and 250° C., NOx concentration of 800 ppm and NH$_3$/NOx molar ratio of 1.0. As the reaction system reached a normal state after performing the SCR at the corresponding reaction temperature, the supply of gaseous oxygen was interrupted and the conversion rate of NOx was measured. At this time, the concentration of oxygen was maintained at 3 vol %, and space velocity was maintained at 120,000 hr$^{-1}$. Also, to eliminate the effects of water adsorbed on the catalysts before the reaction and of oxidation states, the catalysts were maintained at 400° C. in an air atmosphere for 1 hour, and were then cooled to the reaction temperature, followed by the experiment.

Figure 12:
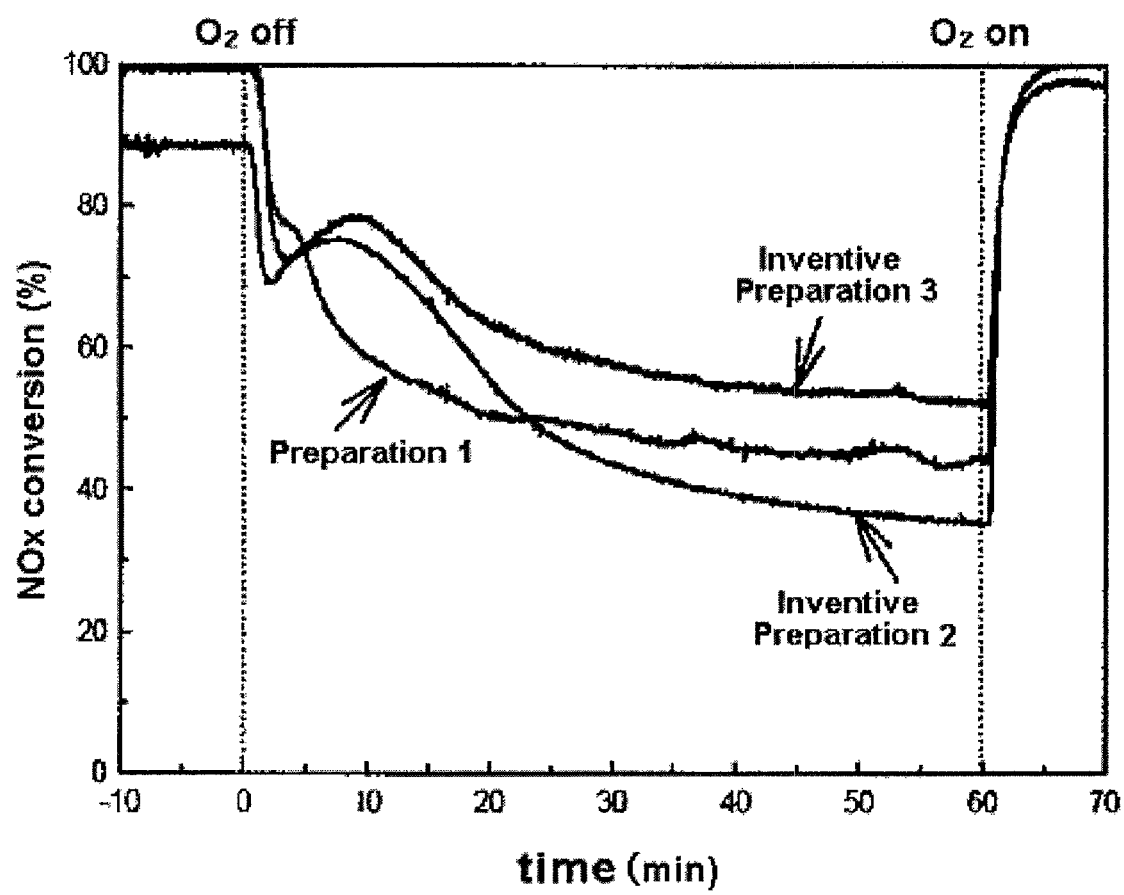
FIGS. 12 and 13 are diagrams showing the results of oxygen on/off experiments at reaction temperatures of 250° C. and 200° C. for the catalysts prepared in Preparation 1 and Inventive Preparations 2 and 3 according to Example 5.
Figure 13:
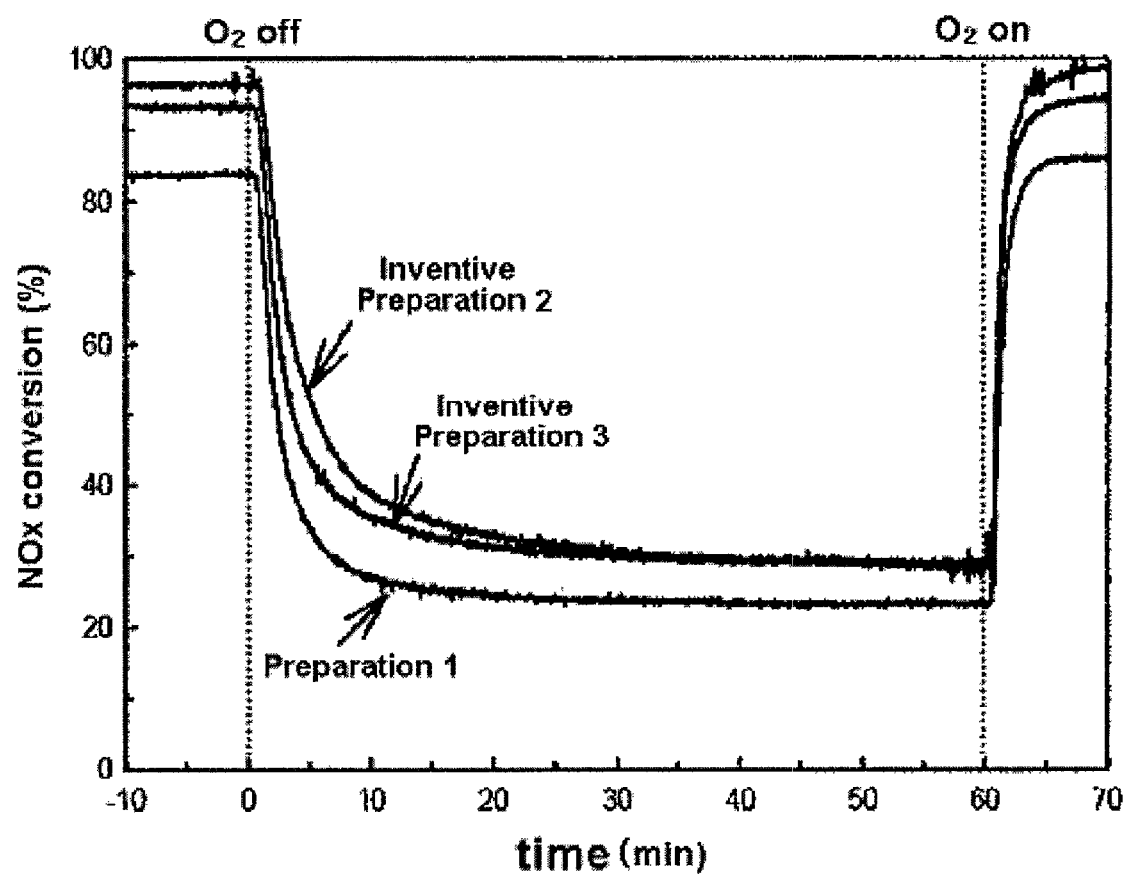

The results of the experiment at 250° C. for the catalysts prepared using the TiO$_2$ (A) support according to Preparation 1 and Inventive Preparations 2 and 3 are shown in FIG. 12, and the results of the experiment at 200° C. are shown in FIG. 13.

As can be seen in FIGS. 12 and 13, at the initial stage of the interruption of the supply of gaseous oxygen, the NOx conversion rate was rapidly reduced, and then the reaction activity was maintained constant with the passage of time. That is, that the reaction activity was maintained somewhat constant connection with reaction temperature. Specifically, an increase in the reaction temperature leads to an increase in the participation of lattice oxygen in the reaction, suggesting that the activation energy required for lattice oxygen to participate in the reaction is determined by the reaction temperature. Thus, a change in activity caused by the reaction temperature can be explained as the participation of lattice oxygen in the reaction. That is, the catalysts prepared according to Inventive Preparations 2 and 3 showed a great increase in the amount of lattice oxygen that participated in the reaction, suggesting that the catalysts had high activity. Thus, in order for the catalysts to have high NOx removal activity, the catalysts should have a large amount of lattice oxygen participating in the reaction, suggesting that electrons move freely in the reaction system. This suggests that, when the participation of catalyst lattice oxygen in the reaction is considered as a redox characteristic, the selective catalytic reduction reaction is strongly dependent on redox characteristics.

Putting the results of Examples 1 to 5 together, the catalyst prepared through ball milling can show high reaction activity not only at high temperatures, but also at low temperatures, because non-stoichiometric chemical species are produced and increased due to high-energy impact, to thus change the surface structure and redox characteristics of the catalyst.

EXAMPLE 6

Figure 14:
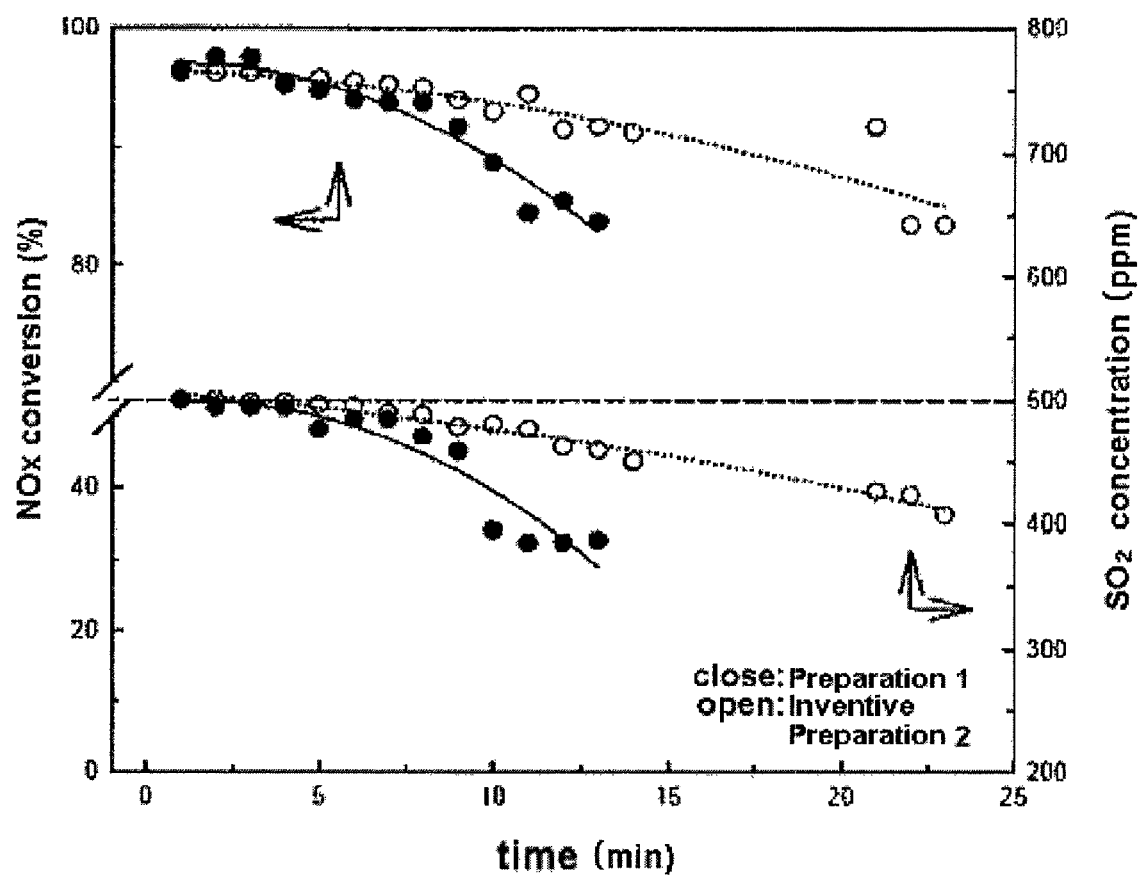
FIG. 14 are diagrams showing NOx conversion and sulfur dioxide concentration as a function of time, when sulfur dioxide-containing flue gas is introduced at a reaction temperature of 250° C., for catalysts prepared in Preparation 1 and Inventive Preparation 2 according to Example 6.

In order to measure the resistance of the inventive catalyst to sulfur dioxide, the catalysts prepared using the TiO$_2$ (A) support according to Preparation 1 and Inventive Preparation 1 while adjusting the loading amount of vanadium were measured for NOx conversion rate with the passage of time in the presence of sulfur dioxide. The measurement results are shown in FIG. 14.

In the experiments, an SCR reaction was carried out at a reaction temperature of 250° C. and an NH$_3$/NOx molar ratio of 1.0 with presenting water of 6 vol % and oxygen of 3 vol %, and then, as the reaction reached a normal state, 500 ppm of sulfur dioxide was artificially supplied, and a decrease in activity with the passage of time was observed.

The catalyst prepared according to Preparation 1 showed a high NOx conversion rate over 90% at a reaction temperature of more than 250° C. when no sulfur dioxide was present. However, when sulfur dioxide was present, the catalyst according to Preparation 1 showed a decrease in NOx conversion rate together with a decrease in initial sulfur dioxide concentration, starting after sulfur dioxide had been supplied for 5 hours, because the oxidation potential of sulfur dioxide into sulfur trioxide was increased due to the high vanadium loading amount of 3 wt %. This is because the supplied sulfur dioxide reacts with unreacted ammonia, resulting from a decrease in reaction activity, to produce ammonium sulfate, and reaction activity was further decreased due to salts produced on the catalysts. On the other hand, the catalyst prepared according to Inventive Preparation 2 prevented the production of ammonium sulfate, causing a reduction in the oxidation potential of sulfur dioxide and the inactivation of the catalyst, and thus the activity thereof was maintained for at least 10 hours when sulfur dioxide was supplied. Accordingly, the catalyst prepared according to the present invention showed not only high NOx removal activity, but also excellent resistance to sulfur dioxide.

The invention claimed is:

1. A method for preparing a selective reduction catalyst for flue gas denitrification, the method comprising a step of supporting 0.5-10 wt %, based on the weight of titania, of vanadium oxide on a titania support having 0.1-10 wt % tungsten, in which the titania support having the vanadium oxide supported thereon is subjected to a ball milling step carried out at a BPMR (ball powder mass ratio) of 10:1-100:1 before and/or after the calcination thereof, wherein the method increases non-stoichiometric vanadium by 16-165%, and non-stochiometric titanium by 19-1,874%, wherein the method comprises the steps of:
   a) providing a vanadium source or precursor aqueous solution;
   b) adding the titania support to the vanadium source or precursor aqueous solution to prepare a slurry;
   c) drying the slurry; and
   d) calcining the dried slurry;
   in which the ball milling step is carried out between steps c) and d) or after step d), in which the ball milling is dry ball milling.

2. The method of claim 1, wherein the titania support has a weight ratio of anatase: rutile of 0:100-100:0, a specific surface area of 4-150 $m^2/g$, and a particle size of 5-100 nm.

3. The method of claim 1, wherein the step d) is carried out in a tube-type, convection-type or grate-type furnace at a temperature of 300-600° C. in an air atmosphere for 3-12 hours.

4. The method of claim 1, further comprising a step of coating the catalyst on a structure selected from the group consisting of metal plates, metal fibers, ceramic filters and honeycombs.

5. The method of claim 1, further comprising a step of extruding the catalyst in the form of particles or monoliths.

6. The method of claim 1, wherein the ball milling step is carried out after the slurry is dried, with BPMR of 30:1-70:1, for 30-180 minutes.

7. The method of claim 1, wherein the ball milling step is carried out after the slurry is calcined, with BPMR of 30:1-70:1, for 30-180 minutes.

* * * * *